US012029961B2

United States Patent
Brammer et al.

(10) Patent No.: US 12,029,961 B2
(45) Date of Patent: *Jul. 9, 2024

(54) FLAGGING IRREGULARITIES IN USER PERFORMANCE IN AN EXERCISE MACHINE SYSTEM

(71) Applicant: iFIT Inc., Logan, UT (US)

(72) Inventors: Chase Brammer, Providence, UT (US); Mark D. Watterson, Logan, UT (US); Rebecca Lynn Capell, Logan, UT (US); Jonathan R. Fischer, Logan, UT (US)

(73) Assignee: iFIT Inc., Logan, UT (US)

( * ) Notice: Subject to any disclaimer, the term of this patent is extended or adjusted under 35 U.S.C. 154(b) by 313 days.

This patent is subject to a terminal disclaimer.

(21) Appl. No.: 17/313,840

(22) Filed: May 6, 2021

(65) Prior Publication Data

US 2021/0299518 A1 Sep. 30, 2021

Related U.S. Application Data

(63) Continuation-in-part of application No. 17/209,714, filed on Mar. 23, 2021, now Pat. No. 11,951,377.
(Continued)

(51) Int. Cl.
*A63B 24/00* (2006.01)
*A63B 22/02* (2006.01)
(Continued)

(52) U.S. Cl.
CPC ........ *A63B 71/0622* (2013.01); *A63B 22/025* (2015.10); *A63B 24/0062* (2013.01);
(Continued)

(58) Field of Classification Search
None
See application file for complete search history.

(56) References Cited

U.S. PATENT DOCUMENTS 3,123,646 A  3/1964  Easton
3,579,339 A  5/1971  Chang et al.
(Continued)

FOREIGN PATENT DOCUMENTS

CN  108697921  10/2018
TW  M488329  10/2014
(Continued)

OTHER PUBLICATIONS

U.S. Appl. No. 29/568,648, filed Jun. 20, 2016, ICON Health & Fitness, Inc.
(Continued)

*Primary Examiner* — Shila Jalalzadeh Abyaneh
(74) *Attorney, Agent, or Firm* — RAY QUINNEY & NEBEKER, P.C.; Paul N. Taylor

(57) ABSTRACT

Flagging irregularities in user performance in an exercise machine system. In one aspect of the disclosure, a method may include receiving first performance parameters of a first user associated with a first exercise machine that is executing a video workout program to enable the first user to perform a workout on the first exercise machine. The method may also include detecting an irregularity in the first performance parameters that indicates a performance of the workout by the first user is different than expected. The method may further include, in response to the detecting of the irregularity, displaying a visually discernable indication with a first performance indicator of the first user to visually indicate the irregularity.

20 Claims, 12 Drawing Sheets

Related U.S. Application Data

(60) Provisional application No. 62/994,204, filed on Mar. 24, 2020.

(51) Int. Cl.
*A63B 71/06* (2006.01)
*G06F 3/14* (2006.01)
*G06V 10/764* (2022.01)
*G06V 40/20* (2022.01)

(52) U.S. Cl.
CPC ... *A63B 2024/0068* (2013.01); *A63B 2220/53* (2013.01); *A63B 2220/803* (2013.01); *G06F 3/1423* (2013.01); *G06V 40/20* (2022.01)

(56) References Cited

U.S. PATENT DOCUMENTS

| | | |
|---|---|---|
| 4,023,795 A | 5/1977 | Pauls |
| 4,300,760 A | 11/1981 | Bobroff |
| 4,413,821 A | 11/1983 | Centafanti |
| D286,311 S | 10/1986 | Martinell et al. |
| 4,681,318 A | 7/1987 | Lay |
| 4,684,126 A | 8/1987 | Dalebout et al. |
| 4,705,028 A | 11/1987 | Melby |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet et al. |
| 4,850,585 A | 7/1989 | Dalebout |
| D304,849 S | 11/1989 | Watterson |
| 4,880,225 A | 11/1989 | Lucas et al. |
| 4,883,272 A | 11/1989 | Lay |
| D306,468 S | 3/1990 | Waterson |
| D306,891 S | 3/1990 | Watterson |
| 4,913,396 A | 4/1990 | Dalebout et al. |
| D307,614 S | 5/1990 | Bingham et al. |
| D307,615 S | 5/1990 | Bingham et al. |
| 4,921,242 A | 5/1990 | Watterson |
| 4,932,650 A | 6/1990 | Bingham et al. |
| D309,167 S | 7/1990 | Griffin |
| D309,485 S | 7/1990 | Bingham et al. |
| 4,938,478 A | 7/1990 | Lay |
| D310,253 S | 8/1990 | Bersonnet et al. |
| 4,955,599 A | 9/1990 | Bersonnet et al. |
| 4,971,316 A | 11/1990 | Dalebout et al. |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout et al. |
| D315,765 S | 3/1991 | Measom et al. |
| 4,998,725 A | 3/1991 | Watterson et al. |
| 5,000,442 A | 3/1991 | Dalebout et al. |
| 5,000,443 A | 3/1991 | Dalebout et al. |
| 5,000,444 A | 3/1991 | Dalebout et al. |
| D316,124 S | 4/1991 | Dalebout et al. |
| 5,013,033 A | 5/1991 | Watterson et al. |
| 5,014,980 A | 5/1991 | Bersonnet et al. |
| 5,016,871 A | 5/1991 | Dalebout et al. |
| D318,085 S | 7/1991 | Jacobson et al. |
| D318,086 S | 7/1991 | Bingham et al. |
| D318,699 S | 7/1991 | Jacobson et al. |
| 5,029,801 A | 7/1991 | Dalebout et al. |
| 5,034,576 A | 7/1991 | Dalebout et al. |
| 5,058,881 A | 10/1991 | Measom |
| 5,058,882 A | 10/1991 | Dalebout et al. |
| D321,388 S | 11/1991 | Dalebout |
| 5,062,626 A | 11/1991 | Dalebout et al. |
| 5,062,627 A | 11/1991 | Bingham |
| 5,062,632 A | 11/1991 | Dalebout et al. |
| 5,062,633 A | 11/1991 | Engel et al. |
| 5,067,710 A | 11/1991 | Watterson et al. |
| 5,072,929 A | 12/1991 | Peterson et al. |
| D323,009 S | 1/1992 | Dalebout et al. |
| D323,198 S | 1/1992 | Dalebout et al. |
| D323,199 S | 1/1992 | Dalebout et al. |
| D323,863 S | 2/1992 | Watterson |
| 5,088,729 A | 2/1992 | Dalebout |
| 5,090,694 A | 2/1992 | Pauls et al. |
| 5,102,380 A | 4/1992 | Jacobson et al. |
| 5,104,120 A | 4/1992 | Watterson et al. |
| 5,108,093 A | 4/1992 | Watterson |
| D326,491 S | 5/1992 | Dalebout |
| 5,122,105 A | 6/1992 | Engel et al. |
| 5,135,216 A | 8/1992 | Bingham et al. |
| 5,135,458 A | 8/1992 | Huang |
| 5,147,265 A | 9/1992 | Pauls et al. |
| 5,149,084 A | 9/1992 | Dalebout et al. |
| 5,149,312 A | 9/1992 | Croft et al. |
| 5,158,520 A | 10/1992 | Lemke |
| 5,171,196 A | 12/1992 | Lynch |
| D332,347 S | 1/1993 | Raadt et al. |
| 5,190,505 A | 3/1993 | Dalebout et al. |
| 5,192,255 A | 3/1993 | Dalebout et al. |
| 5,195,937 A | 3/1993 | Engel et al. |
| 5,203,826 A | 4/1993 | Dalebout |
| D335,511 S | 5/1993 | Engel et al. |
| D335,905 S | 5/1993 | Cutter et al. |
| D336,498 S | 6/1993 | Engel et al. |
| 5,217,487 A | 6/1993 | Engel et al. |
| D337,361 S | 7/1993 | Engel et al. |
| D337,666 S | 7/1993 | Peterson et al. |
| D337,799 S | 7/1993 | Cutter et al. |
| 5,226,866 A | 7/1993 | Engel et al. |
| 5,242,339 A | 9/1993 | Thornton |
| 5,244,446 A | 9/1993 | Engel et al. |
| 5,247,853 A | 9/1993 | Dalebout |
| 5,259,611 A | 11/1993 | Dalebout et al. |
| D342,106 S | 12/1993 | Campbell et al. |
| 5,279,528 A | 1/1994 | Dalebout et al. |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis et al. |
| 5,302,161 A | 4/1994 | Loubert et al. |
| D347,251 S | 5/1994 | Dreibelbis et al. |
| 5,316,534 A | 5/1994 | Dalebout et al. |
| D348,493 S | 7/1994 | Ashby |
| D348,494 S | 7/1994 | Ashby |
| 5,328,164 A | 7/1994 | Soga |
| D349,931 S | 8/1994 | Bostic et al. |
| 5,336,142 A | 8/1994 | Dalebout et al. |
| D351,202 S | 10/1994 | Bingham |
| D351,435 S | 10/1994 | Peterson et al. |
| D351,633 S | 10/1994 | Bingham |
| D352,534 S | 11/1994 | Dreibelbis et al. |
| D353,422 S | 12/1994 | Bostic et al. |
| 5,372,559 A | 12/1994 | Dalebout et al. |
| 5,374,228 A | 12/1994 | Buisman et al. |
| 5,382,221 A | 1/1995 | Hsu et al. |
| 5,385,520 A | 1/1995 | Lepine |
| 5,387,168 A | 2/1995 | Bostic |
| 5,393,690 A | 2/1995 | Fu et al. |
| D356,128 S | 3/1995 | Smith et al. |
| 5,429,563 A | 7/1995 | Engel et al. |
| 5,431,612 A | 7/1995 | Holden |
| D360,915 S | 8/1995 | Bostic et al. |
| 5,468,205 A | 11/1995 | McFall et al. |
| 5,489,249 A | 2/1996 | Brewer et al. |
| 5,492,517 A | 2/1996 | Bostic et al. |
| D367,689 S | 3/1996 | Wilkinson et al. |
| 5,511,740 A | 4/1996 | Loubert et al. |
| 5,512,025 A | 4/1996 | Dalebout et al. |
| D370,949 S | 6/1996 | Furner |
| D371,176 S | 6/1996 | Furner |
| 5,529,553 A | 6/1996 | Finlayson |
| 5,540,429 A | 7/1996 | Dalebout et al. |
| 5,549,533 A | 8/1996 | Olson et al. |
| 5,554,085 A | 9/1996 | Dalebout |
| 5,569,128 A | 10/1996 | Dalebout |
| 5,591,105 A | 1/1997 | Dalebout et al. |
| 5,591,106 A | 1/1997 | Dalebout et al. |

(56) References Cited

U.S. PATENT DOCUMENTS

| | | |
|---|---|---|
| 5,595,556 A | 1/1997 | Dalebout et al. |
| 5,607,375 A | 3/1997 | Dalebout |
| 5,611,539 A | 3/1997 | Watterson |
| 5,622,527 A | 4/1997 | Watterson et al. |
| 5,626,538 A | 5/1997 | Dalebout et al. |
| 5,626,540 A | 5/1997 | Hall |
| 5,626,542 A | 5/1997 | Dalebout et al. |
| D380,024 S | 6/1997 | Novak et al. |
| 5,637,059 A | 6/1997 | Dalebout |
| D380,509 S | 7/1997 | Wilkinson et al. |
| 5,643,153 A | 7/1997 | Nylen et al. |
| 5,645,509 A | 7/1997 | Brewer et al. |
| D384,118 S | 9/1997 | Deblauw |
| 5,662,557 A | 9/1997 | Watterson et al. |
| 5,667,461 A | 9/1997 | Hall |
| 5,669,857 A | 9/1997 | Watterson et al. |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,683,331 A | 11/1997 | Dalebout |
| 5,683,332 A | 11/1997 | Watterson et al. |
| D387,825 S | 12/1997 | Fleck et al. |
| 5,695,433 A | 12/1997 | Buisman |
| 5,695,434 A | 12/1997 | Dalebout et al. |
| 5,695,435 A | 12/1997 | Watterson et al. |
| 5,702,325 A | 12/1997 | Watterson et al. |
| 5,704,879 A | 1/1998 | Watterson et al. |
| 5,718,657 A | 2/1998 | Dalebout et al. |
| 5,720,200 A | 2/1998 | Anderson et al. |
| 5,720,698 A | 2/1998 | Dalebout et al. |
| D392,006 S | 3/1998 | Dalebout et al. |
| 5,722,922 A | 3/1998 | Watterson et al. |
| 5,733,229 A | 3/1998 | Dalebout et al. |
| 5,743,833 A | 4/1998 | Watterson et al. |
| 5,762,584 A | 6/1998 | Daniels |
| 5,762,587 A | 6/1998 | Dalebout et al. |
| 5,772,560 A | 6/1998 | Watterson et al. |
| 5,810,698 A | 9/1998 | Hullett et al. |
| 5,827,155 A | 10/1998 | Jensen |
| 5,830,114 A | 11/1998 | Halfen et al. |
| 5,860,893 A | 1/1999 | Watterson et al. |
| 5,860,894 A | 1/1999 | Dalebout et al. |
| 5,899,834 A | 5/1999 | Dalebout et al. |
| 5,921,892 A | 7/1999 | Easton |
| D412,953 S | 8/1999 | Armstrong |
| D413,948 S | 9/1999 | Dalebout |
| 5,951,441 A | 9/1999 | Dalebout |
| 5,951,448 A | 9/1999 | Bolland |
| D416,596 S | 11/1999 | Armstrong |
| 6,003,166 A | 12/1999 | Hald et al. |
| 6,019,710 A | 2/2000 | Dalebout et al. |
| 6,027,429 A | 2/2000 | Daniels |
| 6,033,347 A | 3/2000 | Dalebout et al. |
| D425,940 S | 5/2000 | Halfen et al. |
| 6,059,692 A | 5/2000 | Hickman |
| D428,949 S | 8/2000 | Simonson |
| 6,113,519 A | 9/2000 | Goto |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout |
| 6,193,631 B1 | 2/2001 | Hickman |
| 6,228,003 B1 | 5/2001 | Hald et al. |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout et al. |
| 6,312,363 B1 | 11/2001 | Watterson et al. |
| D452,338 S | 12/2001 | Dalebout et al. |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris et al. |
| 6,422,980 B1 | 7/2002 | Simonson |
| 6,447,424 B1 | 9/2002 | Ashby et al. |
| 6,458,060 B1 | 10/2002 | Watterson et al. |
| 6,458,061 B2 | 10/2002 | Simonson |
| 6,471,622 B1 | 10/2002 | Hammer et al. |
| 6,506,142 B2 | 1/2003 | Itoh |
| 6,527,678 B1 | 3/2003 | Wang |
| 6,547,698 B2 | 4/2003 | Inagawa |
| 6,563,225 B2 | 5/2003 | Soga et al. |
| 6,601,016 B1 | 7/2003 | Brown et al. |
| 6,623,140 B2 | 9/2003 | Watterson |
| 6,626,799 B2 | 9/2003 | Watterson et al. |
| 6,652,424 B2 | 11/2003 | Dalebout |
| 6,685,607 B1 | 2/2004 | Olsor |
| 6,695,581 B2 | 2/2004 | Wasson et al. |
| 6,701,271 B2 | 3/2004 | Willner et al. |
| 6,702,719 B1 | 3/2004 | Brown et al. |
| 6,712,740 B2 | 3/2004 | Simonson |
| 6,719,667 B2 | 4/2004 | Wong |
| 6,730,002 B2 | 5/2004 | Hald et al. |
| 6,743,153 B2 | 6/2004 | Watterson et al. |
| 6,746,371 B1 | 6/2004 | Brown et al. |
| 6,749,537 B1 | 6/2004 | Hickman |
| 6,761,667 B1 | 7/2004 | Cutler et al. |
| 6,770,015 B2 | 8/2004 | Simonson |
| 6,783,482 B2 | 8/2004 | Oglesby |
| 6,786,852 B2 | 9/2004 | Watterson et al. |
| 6,796,925 B2 | 9/2004 | Martinez |
| 6,808,472 B1 | 10/2004 | Hickman |
| 6,821,230 B2 | 11/2004 | Dalebout et al. |
| 6,830,540 B2 | 12/2004 | Watterson |
| 6,863,641 B1 | 3/2005 | Brown et al. |
| 6,866,613 B1 | 3/2005 | Brown et al. |
| 6,875,160 B2 | 4/2005 | Watterson et al. |
| 6,878,101 B2 | 4/2005 | Colley |
| D507,311 S | 7/2005 | Butler et al. |
| 6,918,858 B2 | 7/2005 | Watterson et al. |
| 6,921,351 B1 | 7/2005 | Hickman et al. |
| 6,974,404 B1 | 12/2005 | Watterson et al. |
| 6,997,852 B2 | 2/2006 | Watterson et al. |
| 7,025,713 B2 | 4/2006 | Dalebout |
| 7,044,897 B2 | 5/2006 | Myers et al. |
| 7,052,442 B2 | 5/2006 | Watterson |
| 7,060,006 B1 | 6/2006 | Watterson et al. |
| 7,060,008 B2 | 6/2006 | Watterson et al. |
| 7,070,539 B2 | 7/2006 | Brown et al. |
| 7,070,542 B2 | 7/2006 | Reyes |
| 7,097,588 B2 | 8/2006 | Watterson |
| D527,776 S | 9/2006 | Willardson et al. |
| 7,112,168 B2 | 9/2006 | Dalebout et al. |
| 7,125,369 B2 | 10/2006 | Endelman |
| 7,128,693 B2 | 10/2006 | Brown et al. |
| 7,132,939 B2 | 11/2006 | Tyndall |
| 7,153,240 B1 | 12/2006 | Wu |
| 7,166,062 B1 | 1/2007 | Watterson et al. |
| 7,166,064 B2 | 1/2007 | Watterson et al. |
| 7,169,087 B2 | 1/2007 | Ercanbrack et al. |
| 7,169,093 B2 | 1/2007 | Simonson et al. |
| 7,172,536 B2 | 2/2007 | Liu |
| 7,192,387 B2 | 3/2007 | Mendel |
| 7,192,388 B2 | 3/2007 | Dalebout et al. |
| 7,250,022 B2 | 7/2007 | Dalebout |
| 7,282,016 B2 | 10/2007 | Simonson |
| 7,285,075 B2 | 10/2007 | Cutler et al. |
| 7,344,481 B2 | 3/2008 | Watterson et al. |
| 7,377,882 B2 | 5/2008 | Watterson |
| 7,425,188 B2 | 9/2008 | Ercanbrack |
| 7,429,236 B2 | 9/2008 | Dalebout et al. |
| 7,452,311 B2 | 11/2008 | Barnes |
| 7,455,622 B2 | 11/2008 | Watterson et al. |
| 7,470,219 B2 | 12/2008 | Larson |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson et al. |
| 7,537,549 B2 | 5/2009 | Nelson et al. |
| 7,537,552 B2 | 5/2009 | Dalebout et al. |

(56) References Cited

U.S. PATENT DOCUMENTS

| | | |
|---|---|---|
| 7,540,828 B2 | 6/2009 | Watterson et al. |
| 7,549,947 B2 | 6/2009 | Watterson et al. |
| 7,556,590 B2 | 7/2009 | Watterson et al. |
| 7,563,203 B2 | 7/2009 | Dalebout et al. |
| 7,575,536 B1 | 8/2009 | Hickman |
| 7,578,771 B1 | 8/2009 | Towley, III et al. |
| 7,601,105 B1 | 10/2009 | Gipson, III et al. |
| 7,604,573 B2 | 10/2009 | Dalebout et al. |
| D604,373 S | 11/2009 | Dalebout et al. |
| 7,618,350 B2 | 11/2009 | Dalebout et al. |
| 7,618,357 B2 | 11/2009 | Dalebout |
| 7,625,315 B2 | 12/2009 | Hickman |
| 7,625,321 B2 | 12/2009 | Simonson et al. |
| 7,628,730 B1 | 12/2009 | Watterson et al. |
| 7,628,737 B2 | 12/2009 | Kowallis et al. |
| 7,637,847 B1 | 12/2009 | Hickman |
| 7,645,212 B2 | 1/2010 | Ashby et al. |
| 7,645,213 B2 | 1/2010 | Watterson |
| 7,658,698 B2 | 2/2010 | Pacheco et al. |
| 7,674,205 B2 | 3/2010 | Dalebout et al. |
| 7,713,171 B1 | 5/2010 | Hickman |
| 7,713,172 B2 | 5/2010 | Watterson et al. |
| 7,713,180 B2 | 5/2010 | Wickens |
| 7,717,828 B2 | 5/2010 | Simonson et al. |
| 7,736,279 B2 | 6/2010 | Dalebout et al. |
| 7,740,563 B2 | 6/2010 | Dalebout et al. |
| 7,749,144 B2 | 7/2010 | Hammer |
| 7,766,797 B2 | 8/2010 | Dalebout |
| 7,771,320 B2 | 8/2010 | Riley |
| 7,771,329 B2 | 8/2010 | Dalebout et al. |
| 7,775,940 B2 | 8/2010 | Dalebout et al. |
| 7,789,800 B1 | 9/2010 | Watterson et al. |
| 7,798,946 B2 | 9/2010 | Dalebout et al. |
| 7,806,589 B2 | 10/2010 | Tashman |
| 7,815,548 B2 | 10/2010 | Barre |
| 7,815,550 B2 | 10/2010 | Watterson et al. |
| 7,857,731 B2 | 12/2010 | Hickman et al. |
| 7,862,475 B2 | 1/2011 | Watterson |
| 7,862,478 B2 | 1/2011 | Watterson et al. |
| 7,862,483 B2 | 1/2011 | Hendrickson et al. |
| 7,862,489 B2 | 1/2011 | Savsek |
| 7,887,470 B2 | 2/2011 | Chen |
| D635,207 S | 3/2011 | Dalebout et al. |
| 7,901,324 B2 | 3/2011 | Kodama |
| 7,901,330 B2 | 3/2011 | Dalebout et al. |
| 7,909,740 B2 | 3/2011 | Dalebout et al. |
| 7,980,996 B2 | 7/2011 | Hickman |
| 7,981,000 B2 | 7/2011 | Watterson et al. |
| 7,985,164 B2 | 7/2011 | Ashby |
| 8,007,409 B2 | 8/2011 | Ellis |
| 8,029,415 B2 | 10/2011 | Ashby et al. |
| 8,033,960 B1 | 10/2011 | Dalebout et al. |
| D650,451 S | 12/2011 | Olson et al. |
| 8,075,453 B1 | 12/2011 | Wilkinson |
| D652,877 S | 1/2012 | Dalebout et al. |
| 8,152,702 B2 | 4/2012 | Pacheco |
| 8,157,708 B2 | 4/2012 | Daly |
| D659,775 S | 5/2012 | Olson et al. |
| D659,777 S | 5/2012 | Watterson et al. |
| D660,383 S | 5/2012 | Watterson et al. |
| D664,613 S | 7/2012 | Dalebout et al. |
| 8,251,874 B2 | 8/2012 | Ashby et al. |
| 8,257,232 B2 | 9/2012 | Albert |
| 8,298,123 B2 | 10/2012 | Hickman |
| 8,298,125 B2 | 10/2012 | Colledge et al. |
| D671,177 S | 11/2012 | Sip |
| D671,178 S | 11/2012 | Sip |
| 8,308,618 B2 | 11/2012 | Bayerlein |
| D673,626 S | 1/2013 | Olson et al. |
| 8,608,624 B2 | 12/2013 | Shabodyash |
| 8,690,735 B2 | 4/2014 | Watterson et al. |
| D707,763 S | 6/2014 | Cutler |
| 8,740,753 B2 | 6/2014 | Olson et al. |
| 8,747,285 B2 | 6/2014 | Hof |
| 8,758,201 B2 | 6/2014 | Ashby et al. |
| 8,771,153 B2 | 7/2014 | Dalebout et al. |
| 8,784,270 B2 | 7/2014 | Watterson |
| 8,784,275 B2 | 7/2014 | Mikan |
| 8,784,278 B2 | 7/2014 | Flake |
| 8,808,148 B2 | 8/2014 | Watterson |
| 8,814,762 B2 | 8/2014 | Butler |
| D712,493 S | 9/2014 | Ercanbrack et al. |
| 8,840,075 B2 | 9/2014 | Olson |
| 8,845,493 B2 | 9/2014 | Watterson et al. |
| 8,870,726 B2 | 10/2014 | Watterson et al. |
| 8,876,668 B2 | 11/2014 | Hendrickson et al. |
| 8,894,549 B2 | 11/2014 | Colledge |
| 8,894,555 B2 | 11/2014 | Olson |
| 8,911,330 B2 | 12/2014 | Watterson et al. |
| 8,920,288 B2 | 12/2014 | Dalebout |
| 8,920,347 B2 | 12/2014 | Bayerlein |
| 8,979,709 B2 | 3/2015 | Toback |
| 8,986,165 B2 | 3/2015 | Ashby |
| 8,992,364 B2 | 3/2015 | Law et al. |
| 8,992,387 B2 | 3/2015 | Watterson et al. |
| D726,476 S | 4/2015 | Ercanbrack |
| 9,028,368 B2 | 5/2015 | Ashby et al. |
| 9,028,370 B2 | 5/2015 | Watterson |
| 9,039,578 B2 | 5/2015 | Dalebout |
| D731,011 S | 6/2015 | Buchanan |
| 9,072,930 B2 | 7/2015 | Ashby et al. |
| 9,119,983 B2 | 9/2015 | Rhea |
| 9,119,988 B2 | 9/2015 | Murray |
| 9,123,317 B2 | 9/2015 | Watterson et al. |
| 9,126,071 B2 | 9/2015 | Smith |
| 9,126,072 B2 | 9/2015 | Watterson |
| 9,138,615 B2 | 9/2015 | Olson et al. |
| 9,142,139 B2 | 9/2015 | Watterson et al. |
| 9,144,703 B2 | 9/2015 | Dalebout et al. |
| 9,149,683 B2 | 9/2015 | Smith |
| 9,186,535 B2 | 11/2015 | Ercanbrack |
| 9,186,549 B2 | 11/2015 | Watterson et al. |
| 9,186,552 B1 | 11/2015 | Deal |
| 9,227,101 B2 | 1/2016 | Maguire |
| 9,233,272 B2 | 1/2016 | Villani |
| 9,254,409 B2 | 2/2016 | Dalebout et al. |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,648 B2 | 3/2016 | Watterson |
| 9,292,935 B2 | 3/2016 | Koduri et al. |
| 9,308,417 B2 | 4/2016 | Grundy |
| 9,339,683 B2 | 5/2016 | Dilli |
| 9,339,691 B2 | 5/2016 | Brammer |
| 9,352,185 B2 | 5/2016 | Hendrickson et al. |
| 9,352,186 B2 | 5/2016 | Watterson |
| 9,364,714 B2 | 6/2016 | Koduri et al. |
| 9,375,605 B2 | 6/2016 | Tyger |
| 9,378,336 B2 | 6/2016 | Ohnemus |
| 9,381,394 B2 | 7/2016 | Mortensen et al. |
| 9,387,387 B2 | 7/2016 | Dalebout |
| 9,393,453 B2 | 7/2016 | Watterson |
| 9,403,047 B2 | 8/2016 | Olson et al. |
| 9,403,051 B2 | 8/2016 | Cutler |
| 9,421,416 B2 | 8/2016 | Mortensen et al. |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen et al. |
| 9,498,668 B2 | 11/2016 | Smith |
| 9,517,378 B2 | 12/2016 | Ashby et al. |
| 9,521,901 B2 | 12/2016 | Dalebout |
| 9,533,187 B2 | 1/2017 | Dalebout |
| 9,539,461 B2 | 1/2017 | Ercanbrack |
| 9,550,091 B2 | 1/2017 | Emerson |
| 9,579,544 B2 | 2/2017 | Watterson |
| 9,586,086 B2 | 3/2017 | Dalebout et al. |
| 9,586,090 B2 | 3/2017 | Watterson et al. |

(56) References Cited

U.S. PATENT DOCUMENTS

| | | |
|---|---|---|
| 9,604,099 B2 | 3/2017 | Taylor |
| 9,616,276 B2 | 4/2017 | Dalebout et al. |
| 9,616,278 B2 | 4/2017 | Olson |
| 9,623,281 B2 | 4/2017 | Hendrickson |
| 9,636,567 B2 | 5/2017 | Brammer et al. |
| 9,675,839 B2 | 6/2017 | Dalebout |
| 9,682,307 B2 | 6/2017 | Dalebout |
| 9,694,234 B2 | 7/2017 | Dalebout et al. |
| 9,694,242 B2 | 7/2017 | Ashby |
| 9,737,755 B2 | 8/2017 | Dalebout |
| 9,750,454 B2 | 9/2017 | Walke |
| 9,757,605 B2 | 9/2017 | Olson et al. |
| 9,764,186 B2 | 9/2017 | Dalebout |
| 9,767,785 B2 | 9/2017 | Ashby |
| 9,776,032 B2 | 10/2017 | Moran |
| 9,795,822 B2 | 10/2017 | Smith et al. |
| 9,795,855 B2 | 10/2017 | Jafarifesharaki |
| 9,808,672 B2 | 11/2017 | Dalebout |
| 9,849,326 B2 | 12/2017 | Smith |
| 9,878,210 B2 | 1/2018 | Watterson |
| 9,889,334 B2 | 2/2018 | Ashby et al. |
| 9,889,339 B2 | 2/2018 | Douglass |
| 9,931,539 B1 * | 4/2018 | de Pablos .......... A63B 71/0616 |
| 9,937,376 B2 | 4/2018 | McInelly et al. |
| 9,937,377 B2 | 4/2018 | McInelly et al. |
| 9,937,378 B2 | 4/2018 | Dalebout et al. |
| 9,937,379 B2 | 4/2018 | Mortensen |
| 9,943,719 B2 | 4/2018 | Smith et al. |
| 9,943,722 B2 | 4/2018 | Dalebout |
| 9,948,037 B2 | 4/2018 | Ashby |
| 9,968,816 B2 | 5/2018 | Olson et al. |
| 9,968,821 B2 | 5/2018 | Finlayson et al. |
| 9,968,823 B2 | 5/2018 | Cutler |
| 9,980,465 B2 | 5/2018 | Hayashi |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith et al. |
| 10,071,285 B2 | 9/2018 | Smith et al. |
| 10,085,586 B2 | 10/2018 | Smith et al. |
| 10,086,254 B2 | 10/2018 | Watterson |
| 10,118,064 B1 | 11/2018 | Cox |
| 10,136,842 B2 | 11/2018 | Ashby |
| 10,186,161 B2 | 1/2019 | Watterson |
| 10,188,890 B2 | 1/2019 | Olson et al. |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout et al. |
| 10,272,317 B2 | 4/2019 | Watterson |
| 10,279,212 B2 | 5/2019 | Dalebout et al. |
| 10,293,211 B2 | 5/2019 | Watterson et al. |
| D852,292 S | 6/2019 | Cutler |
| 10,343,017 B2 | 7/2019 | Jackson |
| 10,376,736 B2 | 8/2019 | Powell et al. |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby et al. |
| 10,441,840 B2 | 10/2019 | Dalebout |
| 10,441,844 B2 | 10/2019 | Powell |
| 10,449,416 B2 | 10/2019 | Dalebout |
| 10,471,299 B2 | 11/2019 | Powell |
| D868,909 S | 12/2019 | Cutler |
| 10,492,519 B2 | 12/2019 | Capell |
| 10,493,349 B2 | 12/2019 | Watterson |
| 10,500,473 B2 | 12/2019 | Watterson |
| 10,537,764 B2 | 1/2020 | Smith et al. |
| 10,543,395 B2 | 1/2020 | Powell et al. |
| 10,561,877 B2 | 2/2020 | Workman |
| 10,561,893 B2 | 2/2020 | Chatterton |
| 10,561,894 B2 | 2/2020 | Dalebout |
| 10,569,121 B2 | 2/2020 | Watterson |
| 10,569,123 B2 | 2/2020 | Hochstrasser |
| 10,625,114 B2 | 4/2020 | Ercanbrack |
| 10,625,137 B2 | 4/2020 | Dalebout |
| 10,661,114 B2 | 5/2020 | Watterson et al. |
| 10,668,320 B2 | 6/2020 | Watterson |
| 10,671,705 B2 | 6/2020 | Capell et al. |
| 10,688,346 B2 | 6/2020 | Brammer |
| 10,702,736 B2 | 7/2020 | Weston et al. |
| 10,709,925 B2 | 7/2020 | Dalebout et al. |
| 10,726,730 B2 | 7/2020 | Watterson |
| 10,729,965 B2 | 8/2020 | Powell |
| 10,758,767 B2 | 8/2020 | Olson |
| 10,786,706 B2 | 9/2020 | Smith |
| 10,864,407 B2 | 12/2020 | Watterson |
| 10,918,905 B2 | 2/2021 | Powell et al. |
| 10,932,517 B2 | 3/2021 | Ashby et al. |
| 10,940,360 B2 | 3/2021 | Dalebout et al. |
| 10,953,268 B1 | 3/2021 | Dalebout et al. |
| 10,953,305 B2 | 3/2021 | Dalebout et al. |
| 10,967,214 B1 | 4/2021 | Olson |
| 10,994,173 B2 | 5/2021 | Watterson |
| 11,000,730 B2 | 5/2021 | Dalebout et al. |
| 11,013,960 B2 | 5/2021 | Watterson et al. |
| 11,033,777 B1 | 6/2021 | Watterson et al. |
| 11,058,913 B2 | 7/2021 | Dalebout et al. |
| 11,058,914 B2 | 7/2021 | Powell |
| 11,058,918 B1 | 7/2021 | Watterson et al. |
| 11,187,285 B2 | 11/2021 | Wrobel |
| 11,298,577 B2 | 4/2022 | Watterson |
| 11,326,673 B2 | 5/2022 | Buchanan |
| 11,338,169 B2 | 5/2022 | Dalebout et al. |
| 11,338,175 B2 | 5/2022 | Watterson et al. |
| 11,426,633 B2 | 8/2022 | Watterson et al. |
| 11,451,108 B2 | 9/2022 | Tinney |
| 11,452,903 B2 | 9/2022 | Watterson |
| 11,511,152 B2 | 11/2022 | Powell et al. |
| 11,534,651 B2 | 12/2022 | Ercanbrack et al. |
| 11,534,654 B2 | 12/2022 | Silcock et al. |
| 11,534,655 B2 | 12/2022 | Dalebout et al. |
| 11,565,148 B2 | 1/2023 | Dalebout et al. |
| 11,596,830 B2 | 3/2023 | Dalebout et al. |
| 11,642,564 B2 | 5/2023 | Watterson |
| 11,673,036 B2 | 6/2023 | Dalebout et al. |
| 11,680,611 B2 | 6/2023 | Wrobel |
| 11,700,905 B2 | 7/2023 | Ashby et al. |
| 11,708,874 B2 | 7/2023 | Wrobel |
| 11,779,812 B2 | 10/2023 | Watterson |
| 11,794,052 B2 | 10/2023 | Olson et al. |
| 11,794,070 B2 | 10/2023 | Hays et al. |
| 11,794,075 B2 | 10/2023 | Watterson et al. |
| 11,850,497 B2 | 12/2023 | Willardson et al. |
| 11,878,199 B2 | 1/2024 | Smith |
| 11,878,206 B2 | 1/2024 | Dalebout et al. |
| 11,931,621 B2 | 3/2024 | Nascimento |
| 11,951,358 B2 | 4/2024 | Watterson et al. |
| 11,951,377 B2 | 4/2024 | Brammer et al. |
| 2002/0016235 A1 | 2/2002 | Ashby et al. |
| 2002/0077221 A1 | 6/2002 | Dalebout et al. |
| 2002/0128127 A1 | 9/2002 | Chen |
| 2002/0159253 A1 | 10/2002 | Dalebout et al. |
| 2003/0171189 A1 | 9/2003 | Kaufman |
| 2004/0091307 A1 | 5/2004 | James |
| 2004/0171464 A1 | 9/2004 | Ashby et al. |
| 2004/0171465 A1 | 9/2004 | Hald et al. |
| 2005/0026750 A1 * | 2/2005 | Oglesby ............. A63B 24/0006 482/4 |
| 2005/0049123 A1 | 3/2005 | Dalebout et al. |
| 2005/0077805 A1 | 4/2005 | Dalebout et al. |
| 2005/0107229 A1 | 5/2005 | Wickens |
| 2005/0164839 A1 | 7/2005 | Watterson et al. |

(56) References Cited

U.S. PATENT DOCUMENTS

| | | |
|---|---|---|
| 2005/0272577 A1 | 12/2005 | Olson et al. |
| 2005/0277520 A1 | 12/2005 | Van Waes |
| 2006/0135322 A1 | 6/2006 | Rocker |
| 2006/0217237 A1 | 9/2006 | Rhodes |
| 2006/0240959 A1 | 10/2006 | Huang |
| 2007/0066448 A1 | 3/2007 | Pan |
| 2007/0117683 A1 | 5/2007 | Ercanbrack et al. |
| 2007/0197353 A1 | 8/2007 | Hundley |
| 2007/0254778 A1 | 11/2007 | Ashby |
| 2008/0242520 A1 | 10/2008 | Hubbard |
| 2008/0300110 A1 | 12/2008 | Smith et al. |
| 2009/0105052 A1 | 4/2009 | Dalebout et al. |
| 2010/0242246 A1 | 9/2010 | Dalebout et al. |
| 2010/0317488 A1 | 12/2010 | Cartaya |
| 2011/0131005 A1 | 6/2011 | Ueshima |
| 2012/0237911 A1 | 9/2012 | Watterson |
| 2012/0295774 A1 | 11/2012 | Dalebout et al. |
| 2013/0014321 A1 | 1/2013 | Sullivan |
| 2013/0035215 A1* | 2/2013 | Ashby ............... A63B 22/0242 482/54 |
| 2013/0123083 A1 | 5/2013 | Sip |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196822 A1 | 8/2013 | Watterson et al. |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson et al. |
| 2013/0281241 A1 | 10/2013 | Watterson |
| 2014/0024499 A1 | 1/2014 | Watterson |
| 2014/0073970 A1 | 3/2014 | Ashby |
| 2014/0121071 A1 | 5/2014 | Strom et al. |
| 2014/0135173 A1 | 5/2014 | Watterson |
| 2014/0274574 A1 | 9/2014 | Shorten et al. |
| 2014/0274579 A1 | 9/2014 | Olson |
| 2014/0287884 A1 | 9/2014 | Buchanan |
| 2014/0309085 A1 | 10/2014 | Watterson et al. |
| 2014/0337451 A1* | 11/2014 | Choudhary ............ G16H 20/30 709/206 |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253210 A1 | 9/2015 | Ashby et al. |
| 2015/0253735 A1 | 9/2015 | Watterson |
| 2015/0253736 A1 | 9/2015 | Watterson |
| 2015/0258560 A1 | 9/2015 | Ashby |
| 2015/0367161 A1 | 12/2015 | Wiegardt |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0206248 A1 | 7/2016 | Sartor et al. |
| 2016/0206922 A1 | 7/2016 | Dalebout et al. |
| 2016/0250519 A1 | 9/2016 | Watterson |
| 2016/0253918 A1 | 9/2016 | Watterson |
| 2016/0339298 A1 | 11/2016 | Kats |
| 2016/0346595 A1 | 12/2016 | Dalebout et al. |
| 2016/0346617 A1 | 12/2016 | Srugo et al. |
| 2017/0036053 A1 | 2/2017 | Smith et al. |
| 2017/0056711 A1 | 3/2017 | Dalebout et al. |
| 2017/0056715 A1 | 3/2017 | Dalebout et al. |
| 2017/0056726 A1 | 3/2017 | Dalebout et al. |
| 2017/0124912 A1 | 5/2017 | Ashby et al. |
| 2017/0193578 A1 | 7/2017 | Watterson |
| 2017/0266483 A1 | 9/2017 | Dalebout et al. |
| 2017/0266489 A1 | 9/2017 | Douglass et al. |
| 2017/0266532 A1 | 9/2017 | Watterson |
| 2017/0270820 A1 | 9/2017 | Ashby |
| 2018/0001135 A1 | 1/2018 | Powell |
| 2018/0036585 A1 | 2/2018 | Powell |
| 2018/0084817 A1 | 3/2018 | Capell et al. |
| 2018/0085630 A1 | 3/2018 | Capell et al. |
| 2018/0089396 A1 | 3/2018 | Capell et al. |
| 2018/0099116 A1 | 4/2018 | Ashby |
| 2018/0099179 A1 | 4/2018 | Chatterton et al. |
| 2018/0099180 A1 | 4/2018 | Wilkinson |
| 2018/0099205 A1 | 4/2018 | Watterson |
| 2018/0111034 A1 | 4/2018 | Watterson |
| 2018/0117383 A1 | 5/2018 | Workman |
| 2018/0117385 A1 | 5/2018 | Watterson et al. |
| 2018/0117393 A1 | 5/2018 | Ercanbrack |
| 2018/0126248 A1* | 5/2018 | Dion ..................... A63B 1/00 |
| 2018/0154207 A1 | 6/2018 | Hochstrasser |
| 2018/0154208 A1 | 6/2018 | Powell et al. |
| 2018/0200566 A1 | 7/2018 | Weston |
| 2018/0243611 A1* | 8/2018 | Bradley ............ A63B 71/0054 |
| 2019/0058370 A1 | 2/2019 | Tinney |
| 2019/0080624 A1 | 3/2019 | Watterson |
| 2019/0168072 A1 | 6/2019 | Brammer |
| 2019/0178313 A1 | 6/2019 | Wrobel |
| 2019/0184234 A1* | 6/2019 | Packles ............ A63B 24/0087 |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0269971 A1 | 9/2019 | Capell et al. |
| 2019/0275366 A1 | 9/2019 | Powell |
| 2019/0282852 A1 | 9/2019 | Dalebout |
| 2019/0328079 A1 | 10/2019 | Ashby et al. |
| 2019/0329091 A1 | 10/2019 | Powell et al. |
| 2019/0336827 A1* | 11/2019 | Intonato ............ A63B 71/0622 |
| 2019/0376585 A1 | 12/2019 | Buchanan |
| 2020/0009417 A1 | 1/2020 | Dalebout |
| 2020/0222751 A1 | 7/2020 | Dalebout |
| 2020/0338389 A1 | 7/2020 | Dalebout |
| 2020/0254295 A1 | 8/2020 | Watterson |
| 2020/0254309 A1 | 8/2020 | Watterson |
| 2020/0254311 A1 | 8/2020 | Watterson |
| 2020/0391069 A1 | 8/2020 | Olson |
| 2020/0276475 A1* | 9/2020 | Casalini ................ G16H 20/30 |
| 2020/0368575 A1 | 11/2020 | Hays |
| 2021/0001177 A1 | 1/2021 | Smith |
| 2021/0046351 A1 | 2/2021 | Ercanbrack |
| 2021/0046353 A1 | 2/2021 | Dalebout |
| 2021/0086018 A1 | 3/2021 | Dalebout |
| 2021/0086032 A1 | 3/2021 | Watterson |
| 2021/0106899 A1 | 4/2021 | Willardson |
| 2021/0110910 A1 | 4/2021 | Ostler et al. |
| 2021/0146221 A1 | 5/2021 | Dalebout et al. |
| 2021/0299518 A1 | 9/2021 | Brammer et al. |
| 2021/0339079 A1 | 11/2021 | Dalebout et al. |
| 2022/0062685 A1 | 3/2022 | Ashby et al. |
| 2022/0104992 A1 | 4/2022 | Ashby |
| 2022/0212052 A1 | 7/2022 | Ercanbrack et al. |
| 2022/0241649 A1 | 8/2022 | Ashby |
| 2022/0241665 A1 | 8/2022 | Dalebout et al. |
| 2022/0241668 A1 | 8/2022 | Willardson et al. |
| 2022/0249912 A1 | 8/2022 | Watterson et al. |
| 2022/0258007 A1 | 8/2022 | Watterson et al. |
| 2022/0258008 A1 | 8/2022 | Watterson et al. |
| 2022/0280857 A1 | 9/2022 | Watterson |
| 2022/0309042 A1 | 9/2022 | Archer |
| 2022/0314078 A1 | 10/2022 | Watterson et al. |
| 2022/0339493 A1 | 10/2022 | Larsen |
| 2022/0339520 A1 | 10/2022 | Toth |
| 2022/0342969 A1 | 10/2022 | Watterson et al. |
| 2022/0347516 A1 | 11/2022 | Taylor |
| 2022/0347548 A1 | 11/2022 | Watterson |
| 2022/0362613 A1 | 11/2022 | Watterson et al. |
| 2022/0362624 A1 | 11/2022 | Dalebout |
| 2022/0395729 A1 | 12/2022 | Toth |
| 2023/0039903 A1 | 2/2023 | Brammer et al. |

(56) References Cited

U.S. PATENT DOCUMENTS

| | | |
|---|---|---|
| 2023/0054845 A1 | 2/2023 | Smith |
| 2023/0122235 A1 | 4/2023 | Ashby et al. |
| 2023/0128721 A1 | 4/2023 | Plummer |
| 2023/0158358 A1 | 5/2023 | Ercanbrack et al. |
| 2023/0181993 A1 | 6/2023 | Taylor et al. |
| 2023/0191189 A1 | 6/2023 | Taylor et al. |
| 2023/0191197 A1 | 6/2023 | Ashby |
| 2023/0218975 A1 | 7/2023 | Toles et al. |
| 2023/0226401 A1 | 7/2023 | Watterson |
| 2023/0271056 A1 | 8/2023 | Cutler et al. |
| 2023/0277892 A1 | 9/2023 | Smith et al. |
| 2023/0285799 A1 | 9/2023 | Dalebout et al. |
| 2023/0304548 A1 | 9/2023 | Wrobel |
| 2023/0321482 A1 | 10/2023 | Vasquez et al. |
| 2023/0330476 A1 | 10/2023 | Ashby et al. |
| 2023/0360248 A1 | 11/2023 | Ashby et al. |
| 2023/0398402 A1 | 12/2023 | Chuang |
| 2023/0405439 A1 | 12/2023 | Brammer et al. |
| 2024/0024734 A1 | 1/2024 | Nielsen et al. |
| 2024/0108938 A1 | 4/2024 | Smith |
| 2024/0108965 A1 | 4/2024 | Willardson et al. |

FOREIGN PATENT DOCUMENTS

| | | |
|---|---|---|
| TW | 201812684 | 4/2018 |
| TW | M584694 | 10/2019 |

OTHER PUBLICATIONS

U.S. Appl. No. 29/702,127, filed Sep. 16, 2019, ICON Health & Fitness, Inc.
U.S. Appl. No. 13/088,007, filed Apr. 15, 2011, Scott R. Watterson.
U.S. Appl. No. 15/821,386, filed Nov. 22, 2017, ICON Health & Fitness, Inc.
U.S. Appl. No. 15/973,176, filed May 7, 2018, Melanie Douglass.
U.S. Appl. No. 16/378,022, filed Apr. 8, 2019, William T. Dalebout.
U.S. Appl. No. 16/435,104, filed Jun. 7, 2019, Dale Alan Buchanan.
U.S. Appl. No. 16/506,085, filed Jul. 9, 2019, ICON Health & Fitness, Inc.
U.S. Appl. No. 62/697,833, filed Jul. 13, 2018, ICON Health & Fitness, Inc.
U.S. Appl. No. 62/796,952, filed Jan. 25, 2019, ICON Health & Fitness, Inc.
U.S. Appl. No. 62/804,146, filed Feb. 11, 2019, ICON Health & Fitness, Inc.
U.S. Appl. No. 62/804,685, filed Feb. 12, 2019, ICON Health & Fitness, Inc.
U.S. Appl. No. 62/852,118, filed May 22, 2019, David Hays.
U.S. Appl. No. 62/866,576, filed Jun. 25, 2019, ICON Health & Fitness, Inc.
U.S. Appl. No. 62/887,391, filed Aug. 15, 2019, ICON Health & Fitness, Inc.
U.S. Appl. No. 62/887,398, filed Aug. 15, 2019, ICON Health & Fitness, Inc.
U.S. Appl. No. 62/897,113, filed Sep. 9, 2019, ICON Health & Fitness, Inc.
U.S. Appl. No. 62/842,118, filed May 23, 2019, ICON Health & Fitness, Inc.
U.S. Appl. No. 62/912,451, filed Sep. 9, 2019, Megan Jane Ostler.
U.S. Appl. No. 29/702,127, filed Sep. 16, 2019, Gordon Cutler.
U.S. Appl. No. 63/073,081, filed Sep. 1, 2020, Darren C. Ashby.
U.S. Appl. No. 17/014,935, filed Sep. 8, 2020, Megan Jane Ostler.
U.S. Appl. No. 63/079,697, filed Sep. 17, 2020, Jared Willardson.
U.S. Appl. No. 63/086,793, filed Oct. 2, 2020, Darren C. Ashby.
U.S. Appl. No. 17/066,485, filed Oct. 9, 2020, Jared Weston.
U.S. Appl. No. 17/096,350, filed Nov. 12, 2020, William T. Dalebout.
U.S. Appl. No. 17/141,880, filed Jan. 5, 2021, Wade A. Powell.
U.S. Appl. No. 63/134,036, filed Jan. 5, 2021, Gaylen Ercanbrack.
U.S. Appl. No. 17/149,299, filed Jan. 14, 2021, William T. Dalebout.
U.S. Appl. No. 17/159,814, filed Jan. 27, 2021, William T. Dalebout.
U.S. Appl. No. 17/172,880, filed Feb. 10, 2021, Darren C. Ashby.
U.S. Appl. No. 63/150,066, filed Feb. 16, 2021, Kent M. Smith.
U.S. Appl. No. 17/178,173, filed Feb. 17, 2021, Evan Charles Tinney.
U.S. Appl. No. 63/156,801, filed Mar. 4, 2021, Eric S. Watterson.
U.S. Appl. No. 17/204,704, filed Mar. 17, 2021, Chris Nascimento.
U.S. Appl. No. 17/209,714, filed Mar. 23, 2021, Chase Brammer.
U.S. Appl. No. 63/165,498, filed Mar. 24, 2021, Mark Archer.
U.S. Appl. No. 63/200,903, filed Apr. 2, 2021, Eric S. Watterson.
U.S. Appl. No. 17/217,938, filed Apr. 8, 2021, Eric S. Watterson.
U.S. Appl. No. 63/316,890, filed Mar. 4, 2022.
Review Guru; "Search Results for: ifit leaderboard"; Webpage; located at: https://www.treadmillreviewguru.com/?s=ifit+leaderboard; accessed on May 6, 2021; 3 pages.
Review Guru; "iFit Leaderboard is Here!"; Webpage; located at: ii. https://www.treadmillreviewguru.com/ifit-leaderboard/; accessed on May 6, 2021; 9 pages.
U.S. Appl. No. 62/994,204, filed Mar. 24, 2020; titled "Leaderboard With Irregularity Flags in an Exercise Machine System".
U.S. Appl. No. 17/209,714, filed Mar. 23, 2021; titled "Leaderboard With Irregularity Flags in an Exercise Machine System".
International Patent Application No. PCT/US2021/023779; filed Mar. 21, 2021; titled "Leaderboard With Irregularity Flags in an Exercise Machine System".
International Search Report and Written Opinion corresponding to PCT/US2021/023779, dated Aug. 11, 2021, 10 pages.
Taiwanese Office Action in Taiwanese Patent Application No. 112113216, dated Sep. 6, 2023, 14 pages.
Taiwanese Notice of Allowance for Taiwan Patent Application No. 110110547, mailed Feb. 2, 2023, 4 pages.
Taiwanese Office Action for Taiwan Patent Application No. 110110547, mailed May 24, 2022, 13 pages.
Taiwanese Office Action for Taiwan Patent Application No. 110110547, mailed Oct. 5, 2022, 5 pages.
Taiwanese Notice of Allowance for Taiwan Patent Application No. 11320105360, mailed Jan. 30, 2024, 4 pages.
U.S. Appl. No. 17/739,819, filed May 9, 2022, Buchanan.
U.S. Appl. No. 17/841,313, filed Jun. 15, 2022, Weston et al.
U.S. Appl. No. 17/963,822, filed Oct. 11, 2022, Powell.
U.S. Appl. No. 18/091,004, filed Dec. 29, 2022, Cox.
U.S. Appl. No. 18/123,026, filed Mar. 17, 2022, Silcock et al.
U.S. Appl. No. 18/210,505, filed Jun. 15, 2022, Nielsen et al.
U.S. Appl. No. 18/622,665, filed Mar. 29, 2022, Watterson et al.
U.S. Appl. No. 29/932,908, filed Mar. 15, 2024, Hoggarth et al.
U.S. Appl. No. 62/273,852, filed Dec. 31, 2015, Watterson.
U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 63/254,470, filed Oct. 11, 2021, Powell.
U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 63/305,976, filed Feb. 2, 2022, Watterson.
U.S. Appl. No. 63/329,270, filed Apr. 8, 2022, Vasquez et al.
U.S. Appl. No. 63/332,581, filed Apr. 25, 2022, Ashby et al.
U.S. Appl. No. 63/338,265, filed May 4, 2022, Ashby et al.
U.S. Appl. No. 63/350,072, filed Jun. 8, 2022, Chuang.
U.S. Appl. No. 63/352,539, filed Jun. 15, 2022, Nielsen et al.
U.S. Appl. No. 63/471,680, filed Jun. 7, 2023, Powell et al.
U.S. Appl. No. 63/550,323, filed Feb. 6, 2024, Brammer.
U.S. Appl. No. 63/555,768, filed Feb. 20, 2024, Nielsen.
U.S. Appl. No. 63/566,041, filed Mar. 15, 2024, Nascimento et al.
U.S. Appl. No. 63/566,053, filed Mar. 15, 2024, Hoggarth et al.
U.S. Appl. No. 63/568,912, filed Mar. 22, 2024, Hoggarth et al.
U.S. Appl. No. 63/620,614, filed Jan. 12, 2024, Brammer et al.

(56) References Cited

OTHER PUBLICATIONS

U.S. Appl. No. 63/620,620, filed Jan. 12, 2024, Brammer.
U.S. Appl. No. 63/621,529, filed Jan. 16, 2024, Brammer.
U.S. Appl. No. 63/622,504, filed Jan. 18, 2024, Brammer.
U.S. Appl. No. 63/631,279, filed Apr. 8, 2024, Brammer et al.

* cited by examiner

First Data:

| Seconds Since Start | 605 |
|---|---|
| Speed (mph) | 6 |
| Incline % | 0.5 |
| HR Zone | 3 |
| Current HR | 150 |
| Workout State* | In Workout |

First CSV Encoding:

| Seconds Since Start | 605 |
|---|---|
| Speed (mph) | 6 |
| Incline % | 0.5 |
| Resistance | N/A |
| Target RPM | N/A |
| Target Watts | N/A |
| Target HR Zone | 3 |
| Target HR | 150 |
| Workout State* | In Workout |
| CSV Encoding | 605,6,0.5,0,0,0,3,150,1 |

* Workout State (0=Warmup, 1=In Workout, 2=Cool Down)

Second Data:

| Seconds Since Start | 606 |
|---|---|
| Speed (mph) | 6 |
| Incline % | 0.5 |
| HR Zone | 3 |
| Current HR | 152 |
| Workout State* | In Workout |

Second CSV Encoding:

| Seconds Since Start | 606 |
|---|---|
| Speed (mph) | 6 |
| Incline % | 0.5 |
| Resistance | N/A |
| Target RPM | N/A |
| Target Watts | N/A |
| Target HR Zone | 3 |
| Target HR | 152 |
| Workout State* | In Workout |
| CSV Encoding | 605,6,0.5,0,0,0,3,152,1 |

\* Workout State (0=Warmup, 1=In Workout, 2=Cool Down)

Third Data:

| Seconds Since Start | 607 |
|---|---|
| Speed (mph) | 5 |
| Incline % | 4.5 |
| HR Zone | 3 |
| Current HR | 156 |
| Workout State* | In Workout |

Third CSV Encoding:

| Seconds Since Start | 607 |
|---|---|
| Speed (mph) | 5 |
| Incline % | 4.5 |
| Resistance | N/A |
| Target RPM | N/A |
| Target Watts | N/A |
| Target HR Zone | 3 |
| Target HR | 156 |
| Workout State* | In Workout |
| CSV Encoding | 607,5,4.5,0,0,0,3,156,1 |

* Workout State (0=Warmup, 1=In Workout, 2=Cool Down)

Fourth Data:

| Seconds Since Start | 608 |
|---|---|
| Speed (mph) | 5 |
| Incline % | 4.5 |
| HR Zone | 3 |
| Current HR | 160 |
| Workout State* | In Workout |

Fourth CSV Encoding:

| Seconds Since Start | 608 |
|---|---|
| Speed (mph) | 5 |
| Incline % | 4.5 |
| Resistance | N/A |
| Target RPM | N/A |
| Target Watts | N/A |
| Target HR Zone | 3 |
| Target HR | 160 |
| Workout State* | In Workout |
| CSV Encoding | 608,5,4.5,0,0,0,3,160,1 |

\* Workout State (0=Warmup, 1=In Workout, 2=Cool Down)

FLAGGING IRREGULARITIES IN USER PERFORMANCE IN AN EXERCISE MACHINE SYSTEM

CROSS-REFERENCE TO RELATED APPLICATION

This application is a continuation-in-part of U.S. Nonprovisional patent application Ser. No. 17/209,714, filed Mar. 23, 2021, which claims the benefit of and priority to U.S. Provisional Patent Application No. 62/994,204, filed Mar. 24, 2020, each of which is incorporated herein by reference in its entirety for all that it discloses.

BACKGROUND

Stationary exercise machines have become an increasingly popular way to exercise. To combat the boredom and burnout that is often experienced by users that exercise with these exercise machines, exercise machines are often sold with a number of different pre-programmed workout programs that are saved within the electronics of the exercise machines. For example, these workout programs may include a "fat burn" workout program, a "hills" workout program, a "performance" workout program, and/or other workout programs.

To enable a user to become more immersed in a workout performed on an exercise machine, some exercise machines are capable of executing video workout programs. A video workout program generally includes a video that depicts a trainer performing a workout to allow one or more users to mimic the workout. For example, where a trainer is running at 6 miles per hour in a video of a video workout program, multiple users may control the running belts of their respective treadmills to likewise operate at 6 miles per hour. Where multiple users are following a trainer depicted in a video workout program, the video workout program may include a leaderboard that ranks the performances of the multiple users during the video workout program. Effective leaderboards can connect users with each other and can make a workout more fun.

One problem faced by users when following a video workout program that includes a leaderboard is that the leaderboard rankings are sometime inaccurate because they do not reflect actual performances by all users. For example, some users may cause their performance during a workout to be reported inaccurately, either intentionally or unintentionally, resulting in a higher leaderboard ranking for those users. Inaccurate leaderboard rankings can be frustrating to users whose performances are accurately reported, especially when the users with inaccurately-reported performances appear higher in the leaderboard rankings. This lack of accuracy in leaderboard rankings in a video workout program can seem unfair and be upsetting to a user of an exercise machine, and can thus limit the ability of the leaderboard to connect the user with other users and make the workout more fun.

The subject matter claimed herein is not limited to embodiments that solve any disadvantages or that operate only in environments such as those described above. Rather, this background is only provided to illustrate one example technology area where some embodiments described herein may be practiced.

SUMMARY

In one aspect of the disclosure, a method for updating a leaderboard in an exercise machine system may include executing, on a first exercise machine, a video workout program to enable a first user to perform a workout on the first exercise machine, monitoring, at the first exercise machine, first performance parameters of the first user during the execution of the video workout program on the first exercise machine, executing, on a second exercise machine, the video workout program to enable a second user to perform the workout on the second exercise machine, and monitoring, at the second exercise machine, second performance parameters of the second user during the execution of the video workout program on the second exercise machine. The method may also include displaying, on a first display at the first exercise machine and on a second display at the second exercise machine, a leaderboard which displays and ranks a first performance indicator of the first user and a second performance indicator of the second user based on the first performance parameters and the second performance parameters, detecting an irregularity in the first performance parameters of the first user, and updating, on the first display at the first exercise machine and on the second display at the second exercise machine, the leaderboard to display an irregularity flag associated with the first performance indicator of the first user to indicate the irregularity in the performance of the first user during the workout.

Another aspect of the disclosure may include any combination of the above-mentioned features and may further include the detecting of the irregularity in the first performance parameters of the first user including detecting that the video workout program was manually paused on the first exercise machine.

Another aspect of the disclosure may include any combination of the above-mentioned features and may further include the detecting of the irregularity in the first performance parameters of the first user including detecting that an incline of the first exercise machine was manually decreased during the execution of the video workout program on the first exercise machine.

Another aspect of the disclosure may include any combination of the above-mentioned features and may further include the detecting of the irregularity in the first performance parameters of the first user including detecting that a resistance of the first exercise machine was manually decreased during the execution of the video workout program on the first exercise machine.

Another aspect of the disclosure may include any combination of the above-mentioned features and may further include the first exercise machine including a first treadmill including a running deck, a running belt, and an electric motor configured to move the running belt during the execution of the video workout program.

Another aspect of the disclosure may include any combination of the above-mentioned features and may further include the detecting of the irregularity in the first performance parameters of the first user including detecting that the first user unexpectedly stepped off of the running belt during the execution of the video workout program on the first treadmill.

Another aspect of the disclosure may include any combination of the above-mentioned features and may further include the detecting that the first user unexpectedly stepped off of the running belt during the performance of the workout on the first treadmill including at least one of: employing a camera at the first treadmill to automatically capture one or more images of the first user unexpectedly absent from the running belt; employing a heart rate monitor to automatically detect an irregular decrease in a heart rate of the first user; or employing a current sensor on the electric motor of the first treadmill to automatically detect an irregular decrease in a current drawn to drive the electric motor.

Another aspect of the disclosure may include any combination of the above-mentioned features and may further include the detecting of the irregularity in the first performance parameters of the first user including detecting that the first user is impersonating an expected user during the execution of the video workout program on the first treadmill, and the detecting that the first user is impersonating the expected user during the execution of the video workout program on the first treadmill including employing a current sensor on the electric motor of the first treadmill to automatically detect an irregular current drawn to drive the electric motor based on an expected weight of the expected user.

Another aspect of the disclosure may include any combination of the above-mentioned features and may further include the detecting of the irregularity in the first performance parameters of the first user includes detecting that an expected input that is indicative of the first user running on the first treadmill is absent.

Another aspect of the disclosure may include any combination of the above-mentioned features and may further include the expected input including at least one of: an expected movement pattern of a head of the first user; expected fluctuations in a speed of the electric motor; expected sounds of the first user striking the running deck through the running belt; or expected impacts of the first user striking the running deck through the running belt.

Another aspect of the disclosure may include any combination of the above-mentioned features and may further include the detecting of the irregularity in the first performance parameters of the first user including detecting that the first user is impersonating an expected user during the execution of the video workout program on the first exercise machine.

Another aspect of the disclosure may include any combination of the above-mentioned features and may further include the detecting that the first user is impersonating the expected user during the execution of the video workout program on the first exercise machine including employing a camera and facial recognition techniques to automatically detect that a face of the first user does not match an expected face of the expected user.

Another aspect of the disclosure may include any combination of the above-mentioned features and may further include the detecting that the first user is impersonating the expected user during the execution of the video workout program on the first exercise machine including employing a heart rate monitor at the first exercise machine to automatically detect that a heart rate pattern of the first user does not match an expected heart rate pattern of the expected user.

Another aspect of the disclosure may include any combination of the above-mentioned features and may further include the detecting that the first user is impersonating the expected user during the execution of the video workout program on the first exercise machine including employing one or more sensors at the first exercise machine to automatically detect that a biometric signature of the first user does not match an expected biometric signature of the expected user.

Another aspect of the disclosure may include any combination of the above-mentioned features and may further include the detecting that the first user is impersonating the expected user during the execution of the video workout program on the first exercise machine including employing a weight sensor on the first exercise machine to automatically detect that a weight of the first user does not match an expected weight of the expected user.

Another aspect of the disclosure may include any combination of the above-mentioned features and may further include the detecting of the irregularity in the first performance parameters of the first user including detecting that a current performance of the workout by the first user is inconsistent with past performance of one or more workouts by the first user.

Another aspect of the disclosure may include any combination of the above-mentioned features and may further include, or may stand alone by including, a method for identifying an irregularity in performance parameters of a user. The method may include receiving first performance parameters of a first user associated with a first exercise machine that executes a video workout program to enable the first user to perform a workout on the first exercise machine. The method may include detecting an irregularity in the first performance parameters that indicates a performance of the workout by the first user is different than expected.

Another aspect of the disclosure may include any combination of the above-mentioned features and may further include the detecting of the irregularity in the first performance parameters of the first user including detecting that the first user manually overrode control by exercise machine control commands of the video workout program of one or more first moveable members of the first exercise machine during the execution of the video workout program on the first exercise machine.

Another aspect of the disclosure may include any combination of the above-mentioned features and may further include the detecting of the irregularity in the first performance parameters of the first user including at least one of: detecting that a difficulty of the workout is less than an expected difficulty of the workout due to a manual adjustment of an operating parameter of the first exercise machine; detecting that the first user has at least temporarily ceased performance of the workout while the video workout program continues to execute on the first exercise machine; or detecting that the first user is impersonating an expected user during the execution of the video workout program on the first exercise machine.

Another aspect of the disclosure may include any combination of the above-mentioned features and may further include the first exercise machine being one of multiple exercise machines, the method further including, in response to the detecting the irregularity, updating a leaderboard displayed on displays at the exercise machines to display an irregularity flag associated with a first performance indicator of the first user to indicate the irregularity in a performance of the first user during the workout.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

Throughout the drawings, identical reference numbers designate similar, but not necessarily identical, elements.

DETAILED DESCRIPTION

Figure 1:
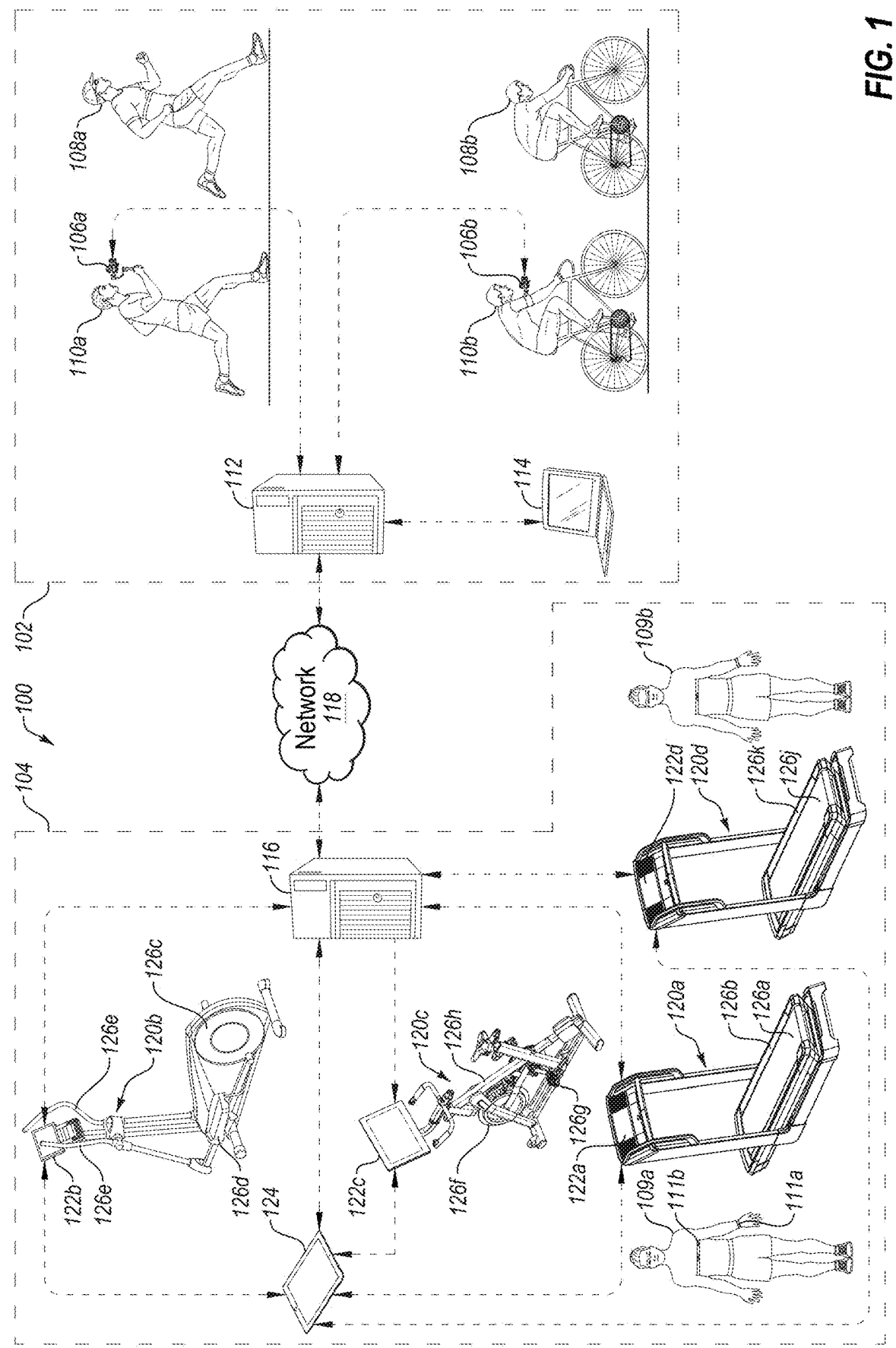
FIG. 1 illustrates a flowchart of an example exercise machine system.

While conventional stationary exercise machines generally include multiple conventional workout programs that are saved within the electronics of the exercise machines, these conventional workout programs are generally not effective at enabling a user to become immersed in workouts performed on the exercise machines. Therefore, some exercise machines are capable of being updated with video workout programs that include a video of a trainer performing a workout to allow one or more users to mimic the workout of the trainer. Video workout programs may also include corresponding control commands that control the exercise machine to mimic the workout performed by the trainer in the video. For example, where a trainer is depicted as running at 6 miles per hour in the video (either along a real-world path such as in a race setting, or on a treadmill in a class setting) of a video workout program, multiple users may control the running belts of their respective treadmills to likewise operate at 6 miles per hour, or the corresponding control commands may control the running belts of their respective treadmills to likewise operate at 6 miles per hour. Where multiple users are following a trainer depicted in a video workout program, the video workout program may include a leaderboard that ranks the performances of the multiple users during the video workout program. Effective leaderboards can connect users with each other and can make a workout more fun.

Unfortunately, however, leaderboards are sometimes less effective because their rankings are sometimes inaccurate because they do not reflect actual performances by all users. For example, some users may cause their performance during a workout to be reported inaccurately, either intentionally or unintentionally, resulting in a higher leaderboard ranking for those users. For example, where a trainer is depicted as running at 6 miles per hour at a 4.5% incline in the video of a video workout program, most users may control the running belts of their respective treadmills to likewise operate at 6 miles per hour at a 4.5% incline, or the corresponding control commands may control the running belts of their respective treadmills to likewise operate at 6 miles per hour at a 4.5% incline, and further accurately report that they are following the workout of the trainer. However, some users may manually cause the running belts of their respective treadmills to operate at 6 miles per hour but at only a 1% incline, but inaccurately report, either intentionally or unintentionally, that they are following the workout of the trainer (including the 4.5% incline). Because running at a 1% incline is dramatically easier than running at a 4.5% incline, these inaccurately-reporting users may run farther than the accurately-reporting users, resulting in a higher leaderboard ranking for these inaccurately-reporting users. Inaccurate leaderboard rankings can be frustrating to users whose performances are accurately reported, especially when the users with inaccurately-reported performances appear higher in the leaderboard rankings. This lack of accuracy in leaderboard rankings in a video workout program can seem unfair and be upsetting to an accurately-reporting user of an exercise machine, and can thus limit the ability of the leaderboard to connect the user with other users and to make the workout more fun.

Some embodiments disclosed herein may include methods for updating a leaderboard in an exercise machine system with an irregularity flag. For example, a method may include executing a video workout program (which may be live or archived) on first and second exercise machines (which may be located locally, such as in the same room in a class setting, or may be located remotely from one another, such as in different homes) to enable first and second users to perform a workout (either simultaneously or at different times), and monitoring performance parameters of the first and second users during the execution of the video workout program on the first and second exercise machines. The method may further include displaying, on first and second displays at the first and second exercise machines, a leaderboard which displays and ranks a first performance indicator of the first user and a second performance indicator of the second user based on the first and second performance parameters. For example, the leaderboard may continuously rank the first and second users based on some performance parameter, such as which user has traveled the greatest distance or gained the most elevation at any given point in time during the workout. The method may also include detecting an irregularity in the performance parameters of the first user (e.g., detecting that the first user manually decreased the incline percentage on their treadmill, resulting in the first user no longer fairly competing against the second user who maintained their incline percentage at the prescribed percentage). When such an irregularity is detected, the method may include updating the leaderboard, on the first and second displays at the first and second exercise machines, to display an irregularity flag (e.g., a yellow circle) associated with the first performance indicator of the first user to indicate the irregularity in the performance of the first user during the workout.

Displaying any user with detected irregularities in their performance parameters on the leaderboard with an irregularity flag may lessen or eliminate the frustration and sense of unfairness felt by users who follow the workout prescribed in a video workout program. As such, effectively employing irregularity flags on a leaderboard may allow users to have greater trust in the leaderboard rankings, and may allow a leaderboard to more effectively connect users with each other and make the workout more fun.

Turning now to the drawings, FIG. 1 illustrates a flowchart of an example exercise machine system 100. The exercise machine system 100 may include a remote location 102 and a local location 104 connected by a network 118.

In some embodiments, the network 118 may be configured to communicatively couple the any two devices in the exercise machine system 100 to one another, and/or to other devices. In some embodiments, the network 118 may be any wired or wireless network, or combination of multiple networks, configured to send and receive communications between systems and devices. In some embodiments, the network 118 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 118 may also be coupled to, or may include, portions of a telecommunications network, including telephone lines, for sending data in a variety of different communication protocols, such as a cellular network or a Voice over IP (VoIP) network.

In the remote location 102, the exercise machine system 100 may include a video camera 106a or 106b that may be employed to capture video of a trainer 108a or 108b performing a workout, and which includes stabilization capabilities to avoid the captured video from being unduly shaky. For example, the video camera 106a may be employed by a videographer 110a to capture video of the trainer 108a performing a workout in which the trainer 108a runs a live marathon. Similarly, the video camera 106b may be employed by a videographer 110b to capture video of the trainer 108b performing a workout in which the trainer 108b rides a bicycle in a live road bicycle race. In either example, the result may be captured video that can be sent to a remote server 112 for further processing. The video may be formatted in any one of multiple video formats, at least some of which being capable of supporting a subtitle stream. Some example formats may include, but are not limited to, MPEG-4, Dynamic Adaptive Streaming over HTTP (MPEG-DASH), and HTTP Live Streaming (HLS).

Next, a producer (not shown) may utilize a computer 114 to input exercise machine control commands for the video into a video workout program, which may be encoded into a subtitle stream of the video, or may be encoded separately from the video. For example, where the video is being produced to be utilized as a live video workout program, the producer may input the exercise machine control commands using the computer 114 synchronously with the videographer 110a or 110b using the video camera 106a or 106b to capture video of the trainer 108a or 108b performing the workout (e.g., during a live event). In this example, the producer may also give corresponding instructions to the trainer, such as through an earpiece worn by the trainer, in order to help the trainer and the producer be in sync following a common script or plan for the workout. Alternatively, where the video is produced to be utilized in a pre-recorded video workout program, the producer may input exercise machine control commands using the computer 114 subsequent to the videographer 110a or 110b using the video camera 106a or 106b to capture video of the trainer 108a or 108b (e.g., minutes, hours, or days after the live event).

In some embodiments, the video workout program, including the captured video and the control commands (which may be encoded in the subtitle stream of the video, or may be encoded separately from the video) may then be transmitted over the network 118 from the remote server 112 in the remote location 102 to a local server 116 in the local location 104.

The video workout program may then be transmitted from the local server 116 to be used in connection with an exercise machine 120a, 120b, 120c, or 120d. For example, the video workout program may be transmitted from the local server 116 to a console 122a, 122b, 122c, or 122d of the exercise machine 120a, 120b, 120c, or 120d, which may include a display, such as a touchscreen display. Alternatively, a separate tablet 124 may function as a console, or may function in connection with a console, of the exercise machine 120a, 120b, 120c, or 120d, and may also include a display, such as a touchscreen display. The tablet 124 may communicate with the console 122a, 122b, 122c, or 122d, and/or with the exercise machine 120a, 120b, 120c, or 120d, via a network connection, such as a Bluetooth connection. In either example, the video and the control commands (which may be encoded in the subtitle stream of the video) may be decoded and/or accessed. Then, the console 122a, 122b, 122c, or 122d and/or the tablet 124 may display the video from the video workout program (e.g., of the trainer 108a or 108b performing the marathon or the road bicycle race at the remote location 102) while simultaneously controlling one or more moveable members of the exercise machine 120a, 120b, 120c, or 120d using the control commands. Additional details regarding controlling an exercise machine using control commands can be found in U.S. patent application Ser. No. 16/742,762, filed Jan. 14, 2020, which is incorporated herein by reference in its entirety for all that it discloses.

Further, during performance of a workout by a user 109a using the video workout program on the exercise machine 120a, 120b, 120c, or 120d, a heart rate of the user 109a may be monitored by the console 122a, 122b, 122c, or 122d, and/or the tablet 124. This heart rate monitoring may be accomplished by receiving continuous heart rate measurements wirelessly (such as over Bluetooth or Ant+) from a heart rate monitoring device worn by the user 109a, such as a heart rate strap 111b or a heart rate watch 111a, or other wearable heart rate monitor. Alternatively, the heart rate monitoring device may be built into another device, such as being built into handlebars or handgrips of the exercise machine 120a, 120b, 120c, or 120d.

The heart rate strap 111b and the heart rate watch 111 are examples of sensors that may be used to generate and/or gather performance parameters or other information of users of the exercise machines 120a, 120b, 120c, and/or 120d. Such sensors may generally include heart rate sensors (such as may be included in the heart rate strap 11b and the heart rate watch 111), current sensors, speed sensors (e.g., tachometers), weight sensors, gait sensors, fingerprint sensors, biometric sensors (e.g., heart rate sensors, gait sensors, fingerprint sensors), accelerometers, or other sensors. Such sensors may be integrated with, included in, coupled to, or otherwise associated with one or more of the exercise machines 120a, 120b, 120c, and/or 120d and/or the users of the exercise machines 120a, 120b, 120c, and/or 120d.

The exercise machine 120a is illustrated in FIG. 1 as a treadmill. The treadmill 120a may include multiple different moveable members, including a running belt 126a and a running deck 126b, which may include one or more operating parameters that are selectively adjustable within a limited range. During performance of a workout using a video workout program on the treadmill 120a, the running belt 126a may rotate and the running deck 126b may incline. One example of an operating parameter on the treadmill 120a is a speed of the running belt 126a. The running belt 126a may rotate at different speeds within a limited range. An actuator (see FIG. 2), for example a belt motor, may selectively adjust the speed at which the running belt 126a rotates within the limited range. Another example of an operating parameter on the treadmill 120a is the inclination of running deck 126b. The running deck 126b may be selectively inclinable to different angles within a limited range. An actuator, for example an incline motor, may selectively adjust the incline of the running deck 126b within the limited range.

The exercise machine 120b is illustrated in FIG. 1 as an elliptical machine. The elliptical machine 120b may include multiple different moveable members, including a flywheel 126c, foot rails or pedals 126d, and handles 126e, which include one or more operating parameters that are selectively adjustable within a limited range. During performance of a workout using a video workout program on the elliptical machine 120b, movement of the foot rails or pedals 126d and the handles 126e may cause the flywheel 126c to rotate. One example of an operating parameter on the elliptical machine 120b is the amount of resistance applied to the flywheel 126c. A differing amount of resistance can be applied to the flywheel 126c to make the movement of the foot rails or pedals 126d and the handles 126e more difficult or less difficult. An actuator, such as a brake, may be used to selectively adjust the amount of resistance that is applied to the flywheel 126c. Another example of an operating parameter on the elliptical machine 120b is the inclination of foot rails or pedals 126d. The foot rails or pedals 126d may be inclinable to different angles within a limited range. An actuator, such as an incline motor, may selectively adjust the incline of the foot rails or pedals 126d within the limited range. Yet another example of an operating parameter on exercise machine 120b is the stride length of the foot rails or pedals 126d and/or the handles 126e. The stride length of the foot rails or pedals 126d and/or the handles 126e may be adjustable to different distances within a limited range. An actuator, for example a stride length motor, may selectively adjust the stride length of the foot rails or pedals 126d and/or the handles 126e within the limited range.

The exercise machine 120c is illustrated in FIG. 1 as an exercise bike. The exercise bike 120c may include multiple different moveable members, including a flywheel 126f, pedals 126g, and a frame 126h, which include one or more operating parameters that are selectively adjustable within a limited range. During performance of a workout using a video workout program on the exercise bike 120c, movement of the pedals 126g may cause the flywheel 126f to rotate. One example of an operating parameter on the exercise bike 120c is the amount of resistance applied to the flywheel 126f. A differing amount of resistance can be applied to the flywheel 126f to make rotation of the pedals 126g more difficult or less difficult. An actuator, such as a brake, may be used to selectively adjust the amount of resistance that is applied to the flywheel 126f within the limited range. Another example of an operating parameter on the exercise bike 120c is the position of the frame 126h. The frame 126h may tilt forward, backward, or from side to side within a limited range. An actuator, such as a tilt motor, may selectively adjust the position of the frame 126h within the limited range.

The exercise machine 120d is illustrated in FIG. 1 as a second treadmill with a running belt 126j and a running deck 126k. During performance of a workout using a video workout program on the treadmill 120d, the running belt 126j may rotate and the running deck 126k may incline, in a similar fashion as with the treadmill 120a.

In some embodiments, multiple users may use the same exercise machine or different exercise machines to perform the same workout using the same video workout program, either simultaneously (e.g., by performing a live video workout or by performing an archived video workout with the same actual start time) or at separate times (e.g., by performing an archived video workout with different start times, but that are time shifted to have the same virtual start times). For example, the trainer 108a may be depicted as performing a running workout in the video (either along a real-world path, or on a treadmill) of a video workout program, and the user 109a may perform the same running workout of the video workout program on the treadmill 120a. Simultaneously at two or more separate times, at the same local location 104 or at two or more separate locations, multiple other users, including the user 109b, may also perform the same running workout of the video workout program on their separate treadmills, such as on the treadmill 120d. Where multiple users are following a trainer depicted in a video workout program, the video workout program may include a leaderboard (e.g., the leaderboards 420a-420d disclosed in FIGS. 4A-4D) that ranks the performances of the multiple users during the video workout program.

Unfortunately, however, leaderboard rankings are sometime inaccurate in that they do not reflect actual performances by all users. Continuing the example above, the user 109a may cause his performance during the running workout to be reported inaccurately, either intentionally or unintentionally, resulting in a higher leaderboard ranking for the user 109a. For example, where the trainer 108a is depicted as running at 6 miles per hour at a 4.5% incline in the video of the video workout program, while most of the users, including the user 109b, may control the running belts of their respective treadmills to likewise operate at 6 miles per hour at a 4.5% incline, or the corresponding control commands may control the running belts of their respective treadmills to likewise operate at 6 miles per hour at a 4.5% incline, the user 109a may manually cause the running belt 126a of his treadmill 120a to operate at less than 6 miles per hour (e.g., at 4 miles per hour) and/or at less than a 4.5% incline (e.g., at a 1% incline), but inaccurately report, either intentionally or unintentionally, that he is following the workout of the trainer (including the 6 miles per hour and the 4.5% incline). Because running at 4 miles per hour and/or at a 1% incline is dramatically easier than running at 6 miles per hour and at a 4.5% incline, the inaccurately-reporting user 109a may run farther than the accurately-reporting users (such as the user 109b), resulting in a higher leaderboard ranking for the inaccurately-reporting user 109a. Inaccurate leaderboard rankings can be frustrating to users whose performances are accurately reported, especially when the user 109a with the inaccurately-reported performance appears higher in the leaderboard rankings. This lack of accuracy in leaderboard rankings in a video workout program can seem unfair and be upsetting to an accurately-reporting user of an exercise machine, such as the user 109b, and can limit the ability of the leaderboard to connect the user 109b with other users and to make the workout more fun.

Continuing with the example above, some methods disclosed herein may include detecting an irregularity in the performance parameters of the user 109a (e.g., detecting that the user 109a manually decreased the speed and/or decreased the incline percentage on his treadmill 120a, resulting in the user 109a no longer fairly competing against the other users, such as the user 109b, who maintained their speed and incline percentage at the prescribed speed and incline percentage). When such an irregularity is detected, some methods disclosed herein may include updating the leaderboard to display an irregularity flag (e.g., a yellow circle) associated with the first performance indicator of the user 109a to indicate the irregularity in the performance of the user 109a during the workout. Displaying the user 109a with an irregularity flag may lessen or eliminate the frustration and sense of unfairness felt by the other users, such as the user 109b, who follow the workout prescribed in a video workout program. As such, effectively employing irregularity flags on a leaderboard may allow users to have greater trust in the leaderboard rankings, and may allow the leaderboard to connect users with each other and make the workout more fun.

Figure 2:
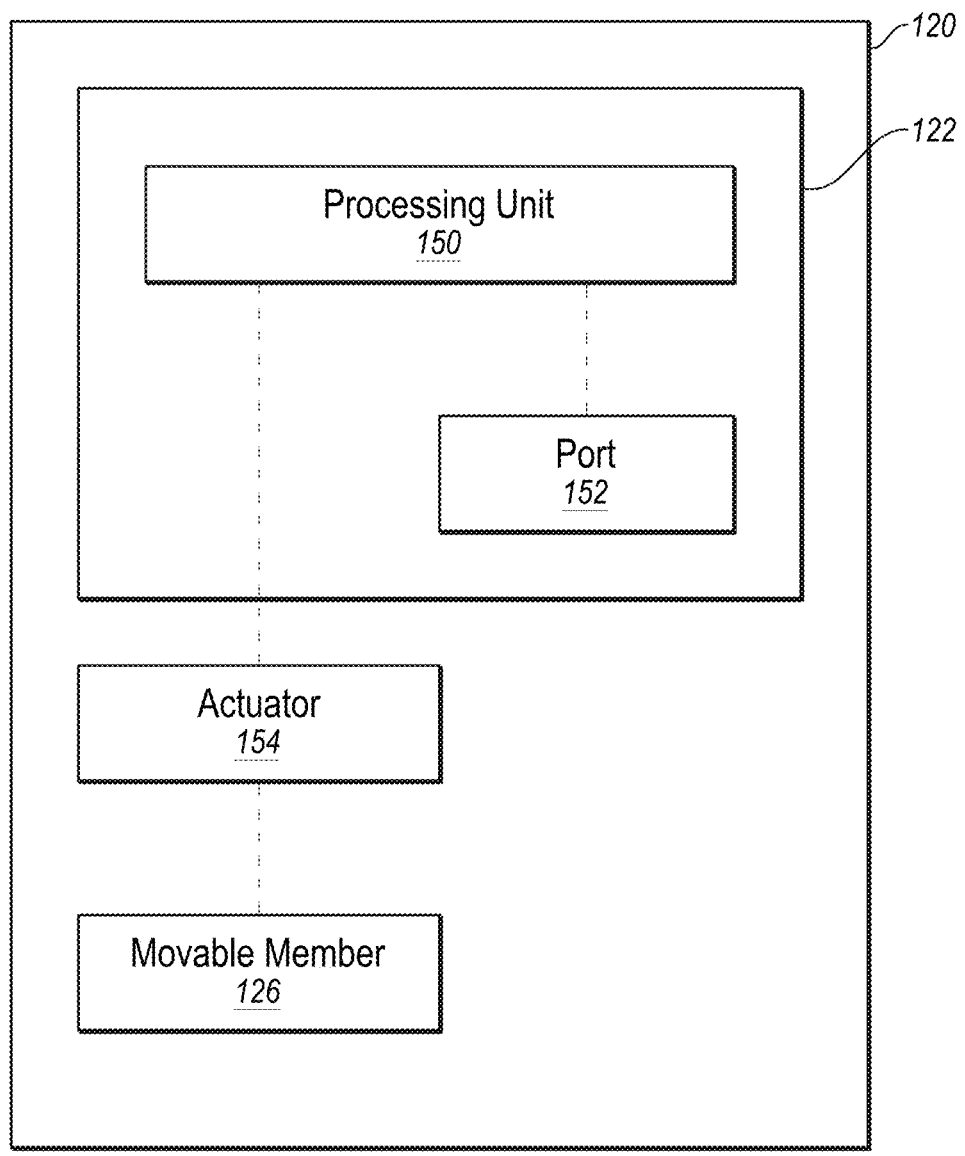
FIG. 2 illustrates a block diagram of an example exercise machine.

FIG. 2 illustrates a block diagram of an example exercise machine 120. The exercise machine 120 of FIG. 2 may represent, and may include similar components to, any of the exercise machine 120a, 120b, 120c, or 120d of FIG. 1, for example.

As disclosed in FIG. 2, the exercise machine 120 may include a processing unit 150, a receiving port 152, an actuator 154, and a moveable member 126. The moveable member 126 may be similar to any of the moveable members 126a-126k of FIG. 1, for example. The processing unit 150 may be communicatively connected to the receiving port 152 and may be included within a console 122, which may be similar to any of the consoles 122a, 122b, 122c, or 122d of FIG. 1, for example. The processing unit 150 may also be communicatively connected to the actuator 154. In response to control commands executed by the processing unit 150, the actuator 154 may selectively adjust one or more operating parameters of the moveable member 126 within a limited range.

Data, including data in a video workout program, can be received by the exercise machine 120 through the receiving port 152. As stated previously, a video workout program may include video as well as control commands. Control commands may provide control instructions to an exercise machine (such as a treadmill, an elliptical machine, an exercise bike, or a rower machine). Control commands may include, for example, control commands for a belt motor, an incline motor, and other actuators. In addition to actuator control commands, control commands may further include distance control commands, time control commands, and/or heart rate zone control commands. These control commands may provide a series of actuator control commands for execution at specific times or at specific distances. For example, a control command for an actuator to be at a certain level for a specific amount of time or for a specific distance. These control commands may also provide a series of actuator control commands for execution at specific times or at specific distances based on a user's monitored heart rate or heart rate trends over time. For example, a control command for an actuator may dictate a certain heart rate zone for a certain amount of time or distance, and a difficulty level of this control command may be dynamically scaled based on a user's monitored heart rate in order to get or keep the user in the certain heart rate zone for the certain amount of time or distance. Additional details regarding dynamically scaling a difficulty level of a control command based on a user's monitored heart rate can be found in U.S. patent application Ser. No. 16/742,762, filed Jan. 14, 2020, which is incorporated herein by reference in its entirety for all that it discloses.

Using a control command, received at the receiving port 152 in a video workout program, such as a control command that is decoded from a subtitle stream of a video of a video workout program for example, the processing unit 150 may control the actuator 154 on the exercise machine 120 in the sequence and at the times or distances specified by the control command. For example, actuator control commands that provide the processing unit 150 with commands for controlling a belt motor, an incline motor, a flywheel brake, stride length motor, or another actuator may be included in the control commands received in a video workout program at the exercise machine 120.

Actuator control commands can be received for different time segments or distance segments of a workout. For example, a ten minute workout may have twenty different control commands that provide the processing unit 150 with a different control command for controlling an actuator every thirty seconds. Alternatively, a ten mile workout may have twenty different control commands that provide a processing unit with a different control command for controlling an actuator every half mile. Workouts may be of any duration or distance and different control commands may be received at any time or distance during the workout. Alternatively, a 5 minute workout may have 300 different control commands that provide the processing unit 150 with a different control command for controlling an actuator once per second.

The control commands received in a video workout program at the exercise machine 120 may be executed by the processing unit 150 in a number of different ways. For example, the control commands may be received and then stored into a read/write memory that is included in the processing unit 150. Alternatively, the control commands may be streamed to the exercise machine 120 in real-time. The control commands may also be received and/or executed from a portable memory device, such as a USB memory stick or an SD card.

In some embodiments, data received by the exercise machine 120 through the receiving port 152 with the video workout program may also include leaderboard data associated with a leaderboard of the video workout program. This leaderboard data may include data associated with individual users who are performing or who have performed a workout of the video workout program. This leaderboard data may be employed by the processing unit 150 to display a leaderboard along with a video of the video workout program on a display associated with the exercise machine 120. Further, in some embodiments, control commands executed by the processing unit 150 may be manually overridden by a user. For example, actuator control commands received in a video workout program that provide the processing unit 150 with commands for controlling a motor of the running belt 126a of the treadmill 120a (see FIG. 1) at 6 miles per hour may be manually overridden by the user 109a to cause the motor of the running belt 126a of the treadmill 120a to operate at a speed that is faster or slower than 6 miles per hour (e.g., 4 miles per hour). Also, in some embodiments, the processing unit 150 may be configured to detect any irregularities in the performance parameters of the user 109a (e.g., detecting that the user 109a manually decreased the speed on his treadmill 120a from 6 miles per hour to 4 miles per hour, resulting in the user 109a no longer fairly competing against the other users who maintained their speed and incline percentage at the prescribed speed). When such an irregularity is detected by the processing unit 150, the processing unit 150 may update the leaderboard to display an irregularity flag (e.g., a yellow circle) associated with the first performance indicator of the user 109a to indicate the irregularity in the performance of the user 109a during the workout. Displaying the user 109a with an irregularity flag may lessen or eliminate the frustration and sense of unfairness felt by the other users who follow the workout prescribed in a video workout program. As such, effectively employing irregularity flags on a leaderboard may allow users to have greater trust in the leaderboard rankings, and may allow the leaderboard to connect users with each other and make the workout more fun.

FIGS. 3A-3D illustrate video frames and charts that may be employed in controlling an exercise machine using exercise machine control commands of a video workout program. In particular, FIGS. 3A-3D illustrate frames 300a-300d of video captured by the videographer 110a (see FIG. 1) of the trainer 108a performing a workout, which may include running a marathon along a path 306. Further, FIGS.

3A-3D also illustrate data charts 302a-302d which contain certain relevant data parameters gathered during the workout at the same time that the corresponding frame of video is captured, manually or automatically using one or more sensors, for example. Finally, FIGS. 3A-3D also illustrate comma separated values (CSV) encoding charts 304a-304d showing how the data parameters from the data charts 302a-302d is translated and encoded into control commands.

The frames 300a-300d of video captured of the trainer 108a running the marathon represent frames of video captured in succession, one second apart. It is understood, however, that other intervening frames of video may also be captured, such as 29 intervening frames of video between each of the successive frames 300a-300d, resulting in a captured video having 30 frames per second. The reason that only one frame per second are illustrated in the frames 300a-300d of video is because the encoding of control commands of a video workout program into a subtitle stream of a video of the video workout program may occur only once per second in the example encoding disclosed in FIGS. 3A-3D. Other encoding rates are also possible, such as encoding twice per second or four times per second, for example. In some embodiments, the encoding rate may be up to as many times per second as there are frames per second (e.g., where the frame rate is 30 frames per second, the encoding rate may up to 30 times per second).

Figure 3A:
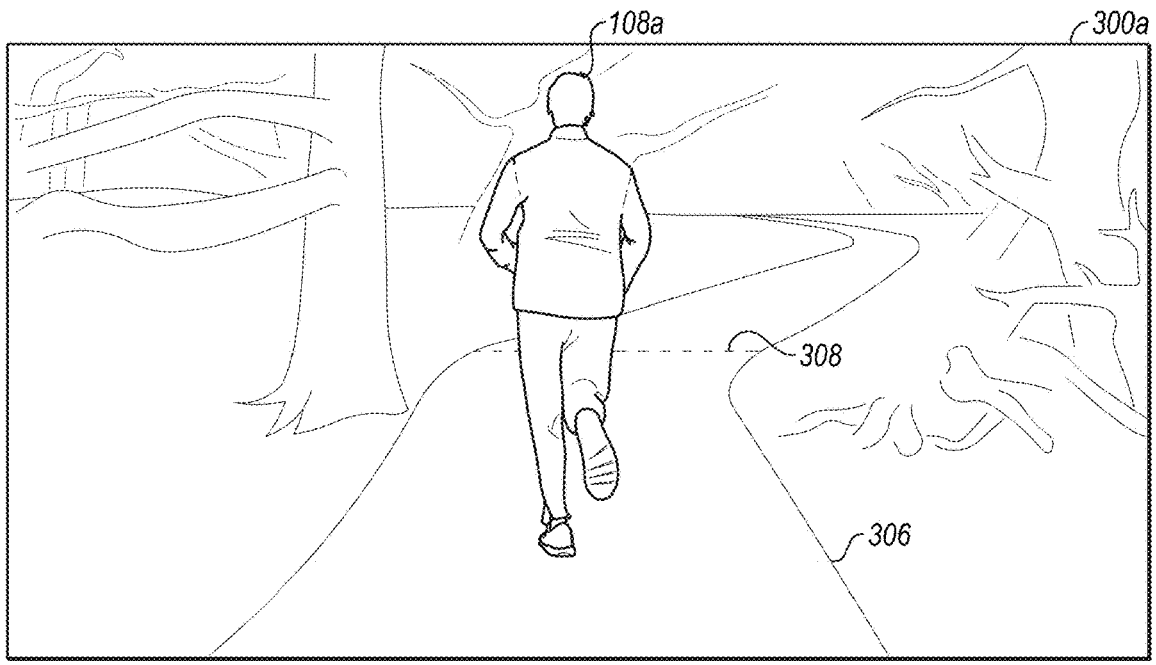
FIGS. 3A-3D illustrate video frames and charts that may be employed in controlling an exercise machine using exercise machine control commands of a video workout program.

As disclosed in the frame 300a of FIG. 3A, the trainer 108a may be performing a workout by running a marathon along the path 306. As disclosed in the data chart 302a, at the time that the frame 300a is captured by a video camera, 605 seconds may have transpired since the start of the workout, the trainer 108a may be running at a pace of 6 miles per hour up a 0.5% incline, the trainer 108a may currently be in a heart rate zone 3 with a heart rate of 150 beats per minute, and may be in a workout state of "In Workout" (as opposed to a workout state of "Warmup" or "Cool Down"). As disclosed in the CSV encoding chart 304a, the data parameters from the data chart 302a may be encoded into a CSV encoding 305a in a subtitle stream of a video, which is timed with (e.g., linked or tied to) the frame 300a, as "605, 6, 0.5, 0, 0, 0, 3, 150, 1", which represents 605 seconds since the start of the workout, a speed of 6 miles per hour, a 0.5% incline, resistance being non-applicable (with N/A being represented by a 0), a target revolutions per minute being non-applicable (with N/A being represented by a 0), a target watts being non-applicable (with N/A being represented by a 0), a target heart rate zone of 3, a target heart rate of 150, and a workout state of 1 (which represents a workout state of "In Workout"). In some embodiments, the CSV encoding 305a may have all values separated by a comma, may have all values be numbers (e.g., numbers between −99999.0 to 99999.0), may not have spaces between values, may encode values in order (e.g., so that the position of each value can be used to interpret the meaning of each value), and may allow for a new value if the new value is appended at the end of the CSV encoding.

Figure 3B:
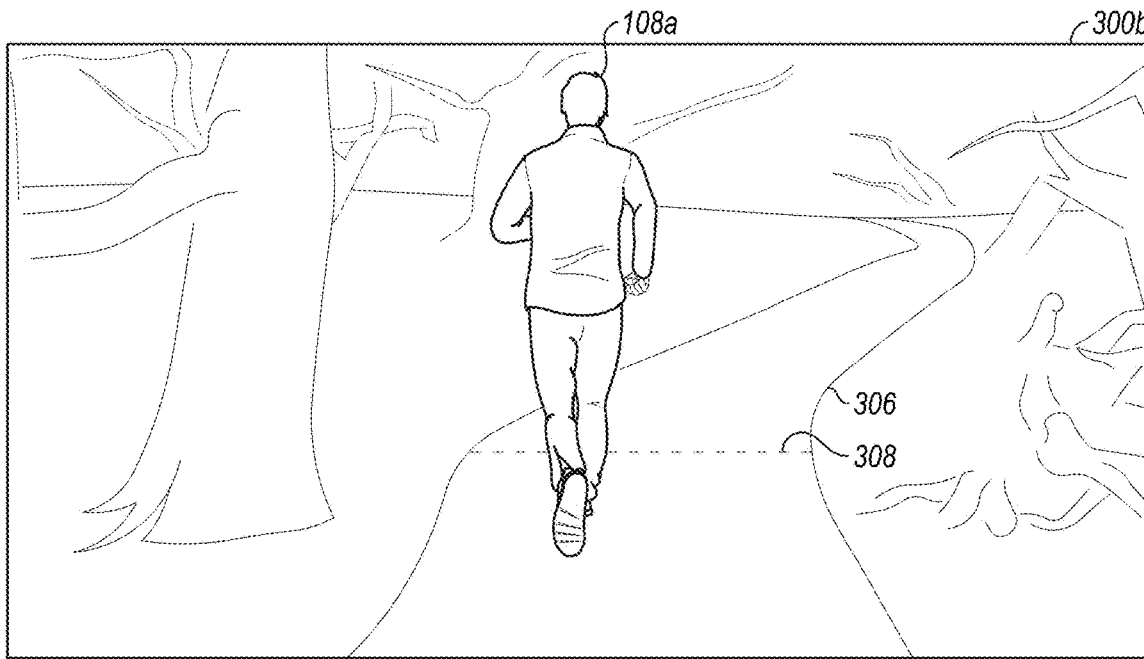

As disclosed in the frame 300b of FIG. 3B, the trainer 108a may continue performing the workout by running the marathon along the path 306. As disclosed in the data chart 302b, at the time that the frame 300b is captured by a video camera, 606 seconds may have transpired since the start of the workout (e.g. one additional second has transpired since the frame 300a was captured), the trainer 108a may still be running at a pace of 6 miles per hour up a 0.5% incline, the trainer 108a may still be in heart rate zone 3 but with an increased heart rate of 152 beats per minute, and may still be in a workout state of "In Workout." As illustrated in frame 300b, the trainer 108a may be approaching a transition 308 in the path 306 where the incline transitions from a relatively gradual 0.5% incline to a relatively steep 4.5% incline. As disclosed in the CSV encoding chart 304b, the data parameters from the data chart 302b may be encoded into a CSV encoding 305b in a subtitle stream of a video, which is timed with frame 300b, as "606, 6, 0.5, 0, 0, 0, 3, 152, 1".

Figure 3C:
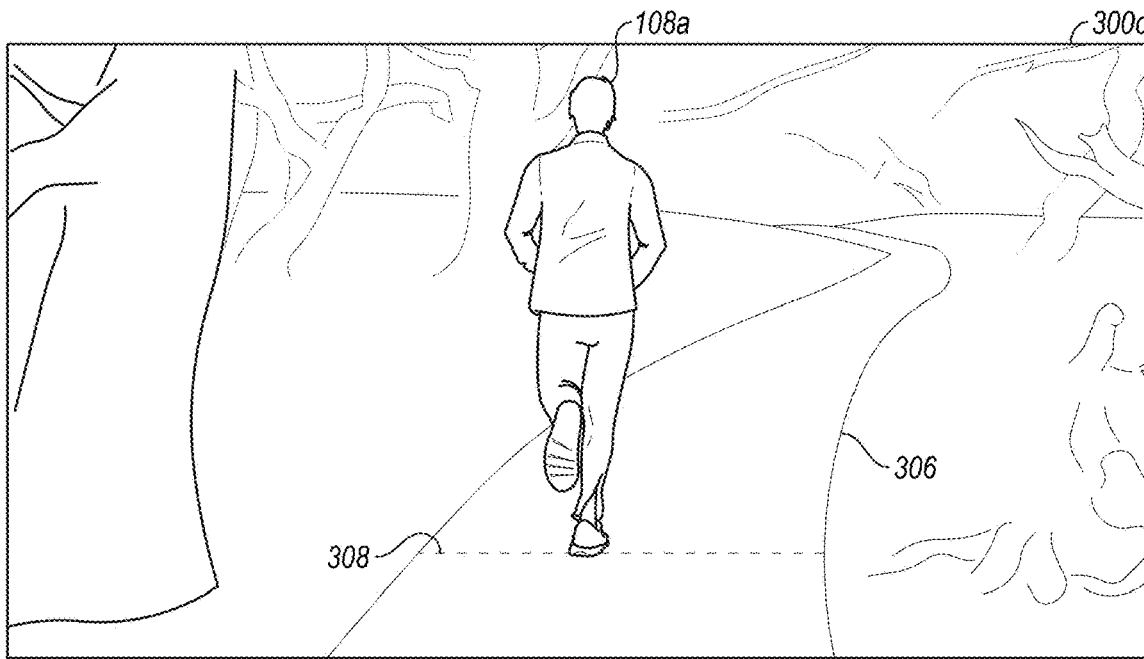

As disclosed in the frame 300c of FIG. 3C, the trainer 108a may continue performing the workout by running the marathon along the path 306. As disclosed in the data chart 302c, at the time that the frame 300c is captured by a video camera, 607 seconds may have transpired since the start of the workout (e.g. one additional second has transpired since the frame 300b was captured, and two additional seconds have transpired since the frame 300a was captured), the trainer 108a may now have slowed to running at a pace of 5 miles per hour up a 4.5% incline, the trainer 108a may still be in heart rate zone 3 but with an increased heart rate of 156 beats per minute, and may still be in a workout state of "In Workout." As illustrated in frame 300c, the trainer 108a may have crossed over the transition 308 in the path 306 where the incline transitions from the relatively gradual 0.5% incline to the relatively steep 4.5% incline, which may account for the slower speed and increased heart rate of the trainer 108a. As disclosed in the CSV encoding chart 304c, the data parameters from the data chart 302c may be encoded into a CSV encoding 305c in a subtitle stream of a video, which is timed with the frame 300c, as "607, 5, 4.5, 0, 0, 0, 3, 156, 1".

Figure 3D:
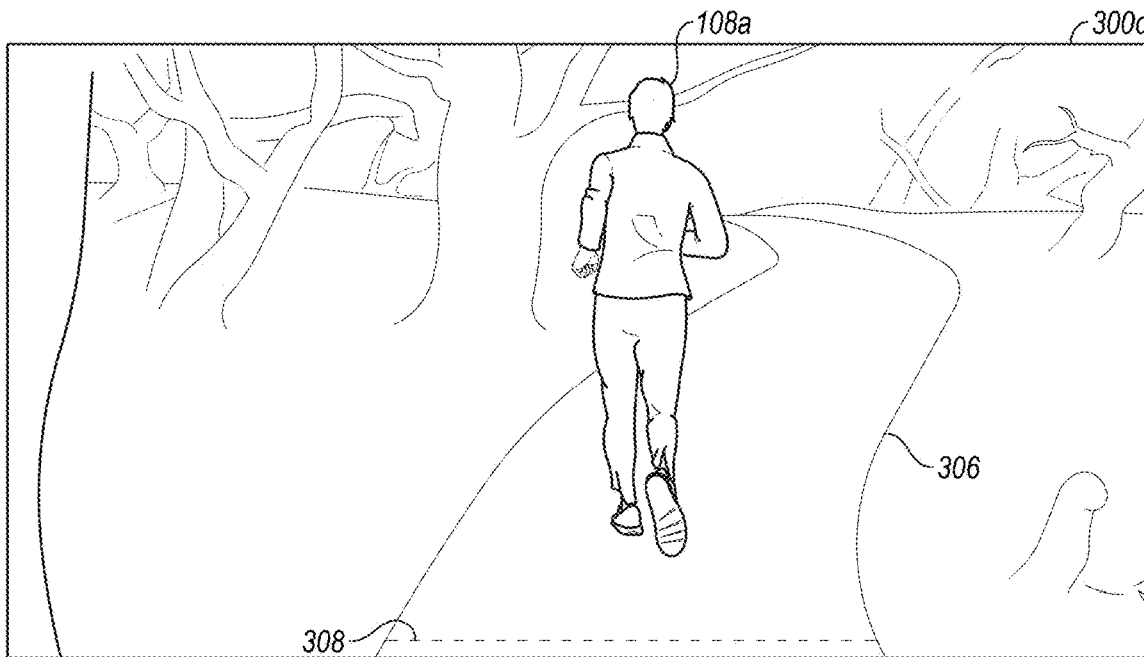

As disclosed in the frame 300d of FIG. 3D, the trainer 108a may continue performing the workout by running the marathon along the path 306. As disclosed in the data chart 302d, at the time that the frame 300d is captured by a video camera, 608 seconds may have transpired since the start of the workout (e.g. one additional second has transpired since the frame 300c was captured, two additional seconds have transpired since the frame 300b was captured, and three additional seconds have transpired since the frame 300a was captured), the trainer 108a may still be running at a pace of 5 miles per hour up a 4.5% incline, the trainer 108a may still be in heart rate zone 3 but with an increased heart rate of 160 beats per minute, and may still be in a workout state of "In Workout." As disclosed in the CSV encoding chart 304d, the data parameters from the data chart 302d may be encoded into a CSV encoding 305d in a subtitle stream of a video, which is timed with the frame 300d, as "608, 5, 4.5, 0, 0, 0, 3, 160, 1".

Due to the fact that, in a video, the frames 300a-300d from the video are timed with frames of the subtitle stream, the encoding of control commands in a subtitle stream, such as in the CSV encodings 305a-305d illustrated in the CSV encoding charts 304a-304d, maintains synchronization of the video of a video workout program and of corresponding control commands of the video workout program. For example, even if the video is buffered or otherwise delayed, the subtitle stream will also be buffered or otherwise delayed by an identical amount, which will maintain synchronization of the video and of corresponding control commands. This synchronization between a video and corresponding control commands in a video workout program can enable a user to become immersed in a workout on the exercise machine.

FIGS. 4A-4D illustrate video frames that may be employed in updating a leaderboard in an exercise machine system with an irregularity flag. In particular, FIGS. 4A-4D illustrate frames 400a-400d of video captured by the videographer 110a (see FIG. 1) of the trainer 108a performing a workout, which may include running a marathon along a path 406. Further, FIGS. 4A-4D also illustrate widgets 408a-408d and 410a-410d which may overlay the frames 400a-400d, respectively, when dynamic scaling based on heart rate monitoring is active during a workout. In some embodiments, the dynamic scaling can be toggled on and off by a user using, for example, a "Smart HR Training" control. FIGS. 4A-4D also illustrate leaderboards 420a-420d that rank the performances of multiple users during the video workout program.

The frames 400a-400d of a video, which show the trainer 108a running the marathon, represent frames of video captured over time. It is understood, however, that other intervening frames of video may also be captured between each of the frames 400a-400d, resulting in a captured video having additional frames (e.g., with a frame rate of 24, 30, or 60 frames per second).

Figure 4A:
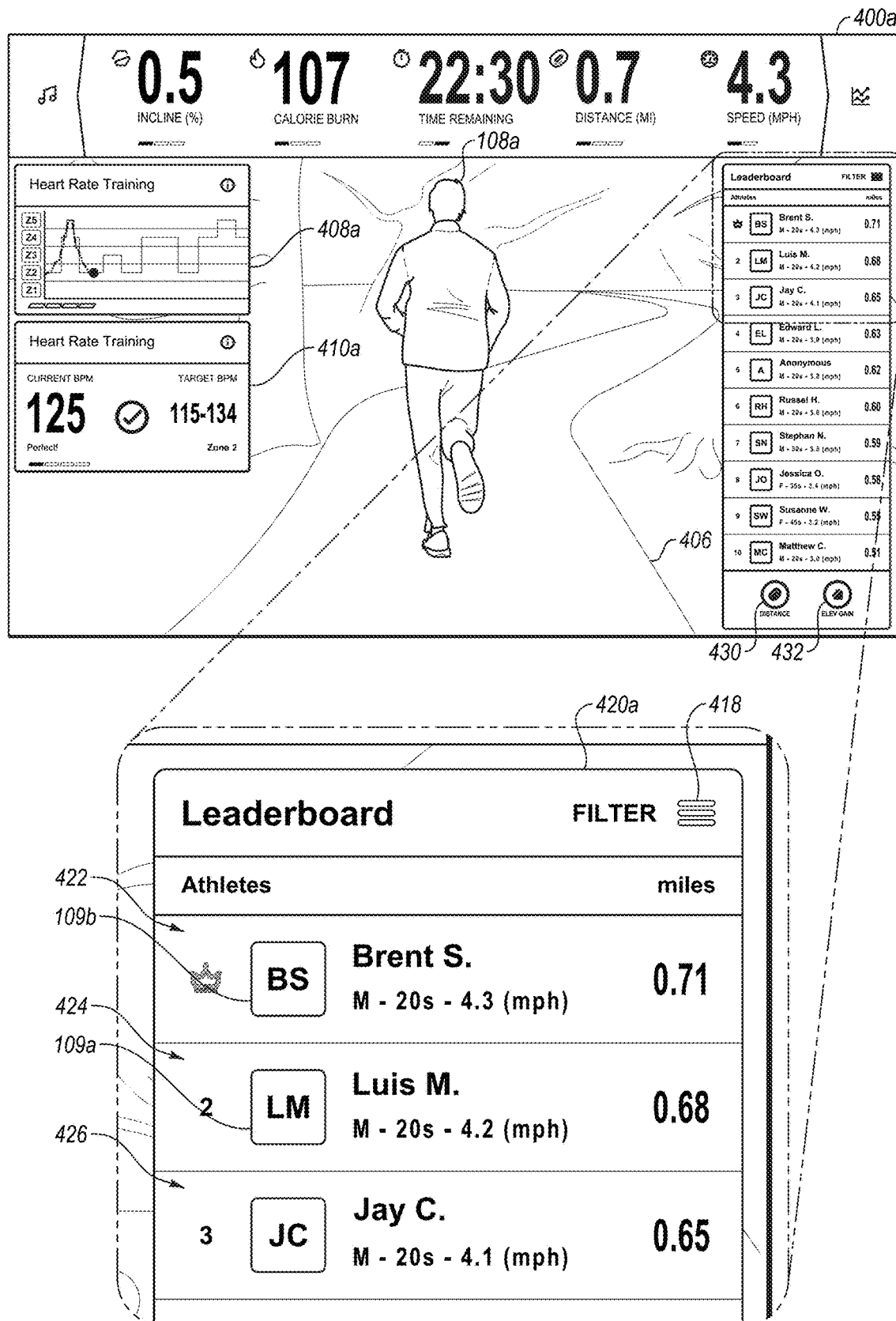
FIGS. 4A-4D illustrate video frames that may be employed in updating a leaderboard in an exercise machine system with an irregularity flag.

As disclosed in the frame 400a of FIG. 4A, the trainer 108a may be performing a workout by running a marathon along the path 406. As disclosed in the frame 400a, the user 109b may be running on his treadmill 120d at a 0.5% incline at a speed of 4.3 mph. Further, as disclosed in the leaderboard 420a, the user 109b may be competing against at least nine other users on their respective treadmills (and potentially other users as well), including the user 109a on the treadmill 120a. These other users may be performing their workouts on their treadmills simultaneously with the user 109b with their real-time performance being reflected in the leaderboard 420a, or they may have performed their workouts on their treadmills previously with the prior recorded performance being reflected in the leaderboard 420a, or some users may be performing their workouts in real-time while others may have performed their workouts previously. When another user performed their workout previously, their performance on the leaderboard 420a may reflect their prior performance at the same point in time of the workout (e.g., by virtually shifting the start time of the earlier performance to match the start time of the later performance so the two performances can be compared). Thus, the performance of each of the users listed in the leaderboard 420a may reflect their performance during the workout at the point where 22 minutes and 30 seconds were remaining in the workout, regardless of whether they are preforming the workout in real-time or performed the workout previously.

As disclosed in FIG. 4A, the leaderboard 420a includes an Athletes label under which a numerical ranking of each user is listed (with the exception of the number one, which is represented by a crown, because the first place user is sometimes referred to as "the king" or "the queen"). The leaderboard 420a also includes a filter 418 which allows the leaderboard 420a to be filtered by different filter criteria. This filter criteria may allow, for example, subsets of users to appear in the leaderboard 420a instead of all users, such as only males or females; only users of a certain age or age range; only users of a specified fitness level; only users designated as friends in the subscription service (or users being "followed" by the user in the subscription service); only users with specified equipment (e.g., specified by brand, model, and/or category, in some cases to only compare against identical exercise machines); only users with a specified workout history (e.g., only users who completed the same workout within a time period such as 30 days or one year); only users who do, or do not, have an associated irregularity flag; only users that have, or have not, completed the workout (e.g., to filter out users who only partially completed the workout); only the user themself (e.g., where a user completed the same workout previously, and would now like to only compete with their own previous performance in the leaderboard); or some combination therefore. In some embodiments, even if the user setting the filter criteria does not fit the specified filter criteria, the user will nevertheless be displayed in the leaderboard 420a. Further, the leaderboard 420a includes a distance button 430 and an elevation gain button 432. When selected, these buttons re-rank the leaderboard 420a based on distance (which on an exercise bike may be calculated based both on pedaling speed and resistance) or elevation gain, respectively. In some embodiments, other workouts may include other buttons that re-rank the leaderboard based on other criteria such as calories burned, watts, joules, effort score (which may normalize for differences in fitness levels among users), average workload, average speed, etc. In some embodiments, the ranking and/or filter criteria of the leaderboard may be modified in real-time by the user throughout the workout.

Further, as disclosed in the leaderboard 420a, with 22 minutes and 30 seconds remaining in the workout, the user 109b (named Brent S. with performance indicators 422, which include a current or average speed in miles per hour and a total distance in miles) sits atop the leaderboard 420a due to the fact that Brent S. has run further during the workout than any other user. In other words, at the time of the leaderboard 420a, Brent S. is in first place in the leaderboard 420a (represented by a crown), while user 109a (named Luis M. with performance indicators 424) is in second place, and Jay C. (with performance indicators 426) is in third place.

Figure 4B:
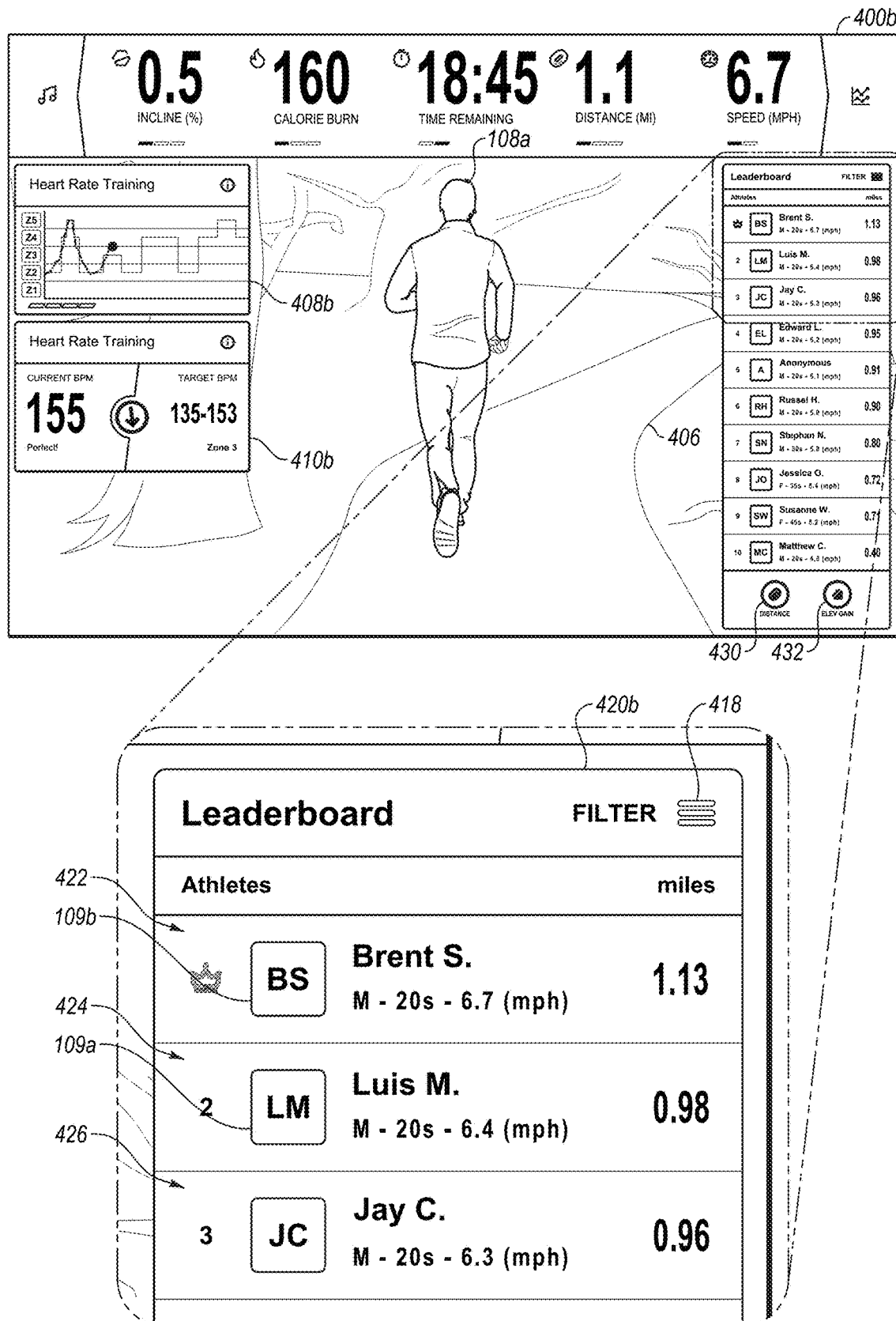

As disclosed in the frame 400b of FIG. 4B, the user 109b may be running on his treadmill 120d at a 0.5% incline at a speed of 6.7 mph. Further, as disclosed in the leaderboard 420b, with 18 minutes and 45 seconds remaining, the user 109b (Brent S. with the performance indicators 422) still sits atop the leaderboard 420b due to the fact that Brent S. has run further during the workout than any other user. In other words, at the time of the leaderboard 420b, Brent remains in first place in the leaderboard 420b (represented by a crown), while user 109a (Luis M. with the performance indicators 424) remains in second place, and Jay C. (with the performance indicators 426) remains in third place.

Figure 4C:
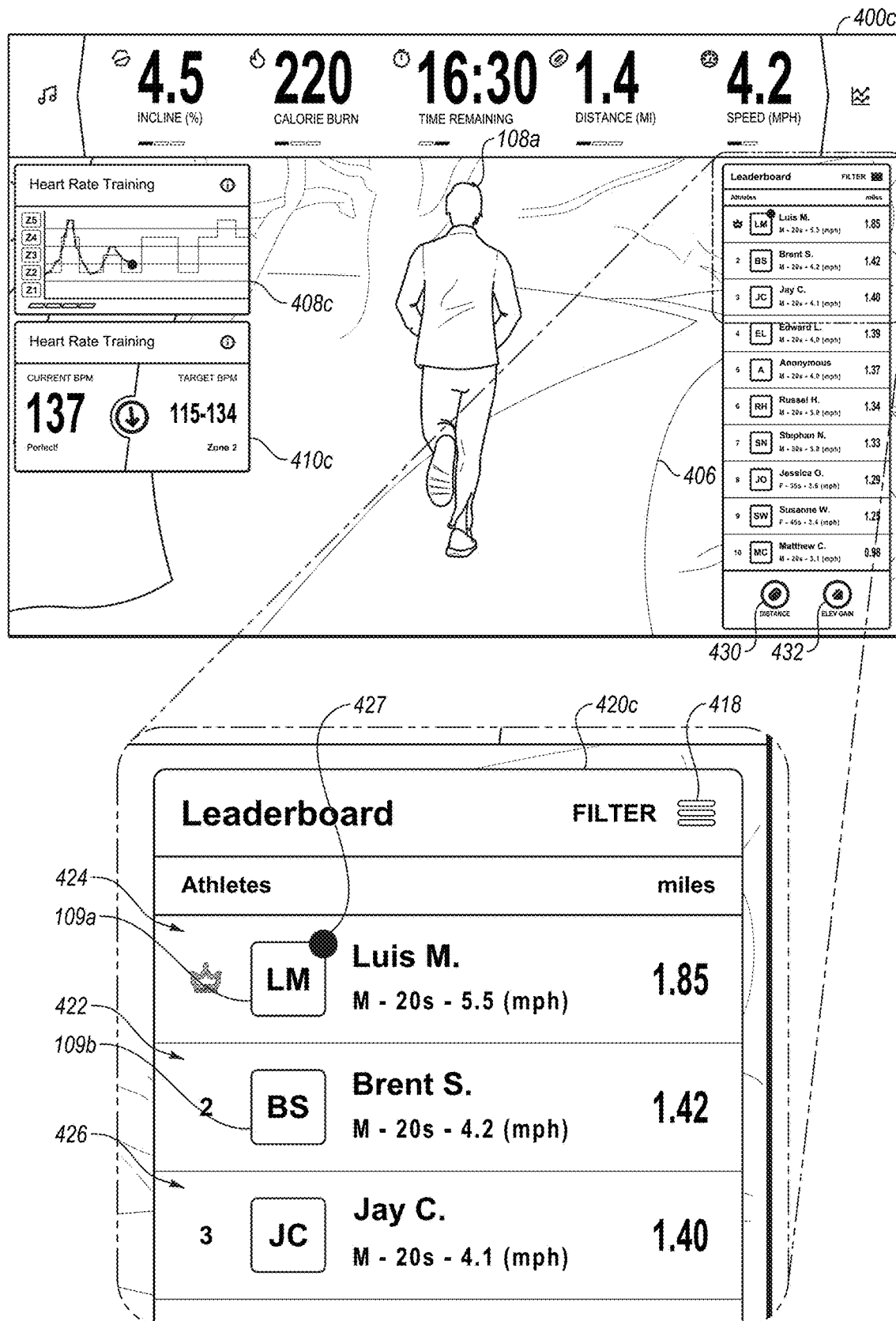

As disclosed in the frame 400c of FIG. 4C, the user 109b may be running on his treadmill 120d at a 4.5% incline at a speed of 4.2 mph. Further, as disclosed in the leaderboard 420c, with 16 minutes and 30 seconds remaining, the user 109b (Brent S. with the performance indicators 422) no longer sits atop the leaderboard 420b due to the fact that user 109a (Luis M. with the performance indicators 424) has purportedly run further during the workout than Brent S. and any other user. In other words, at the time of the leaderboard 420c, Luis M. is now in first place in the leaderboard 420c (represented by a crown), while Brent S. has moved to second place, with Jay C. (with the performance indicator 426) remaining in third place.

However, due to one or more irregularities having been detected during the workout of Luis M. (with the performance indicators 424) sometime between the times of the frame 400b and the frame 400c (e.g., it was detected that Luis M. manually caused the running deck 126k of the treadmill 120d to operate at only a 1% incline instead of the prescribed 4.5% incline), the leaderboard 420c has been updated to display an irregularity flag 427 associated with the performance indicators 424 of Luis M., to indicate one or more irregularities in the performance of Luis M. during the workout. Thus, the irregularity flag 427 serves to alert all of the users, and anyone else viewing the leaderboard 420c, that one or more irregularities were detected sometime during the workout performed by Luis M., and therefore the ranking of Luis M. in first place may not be a legitimate ranking.

Figure 4D:
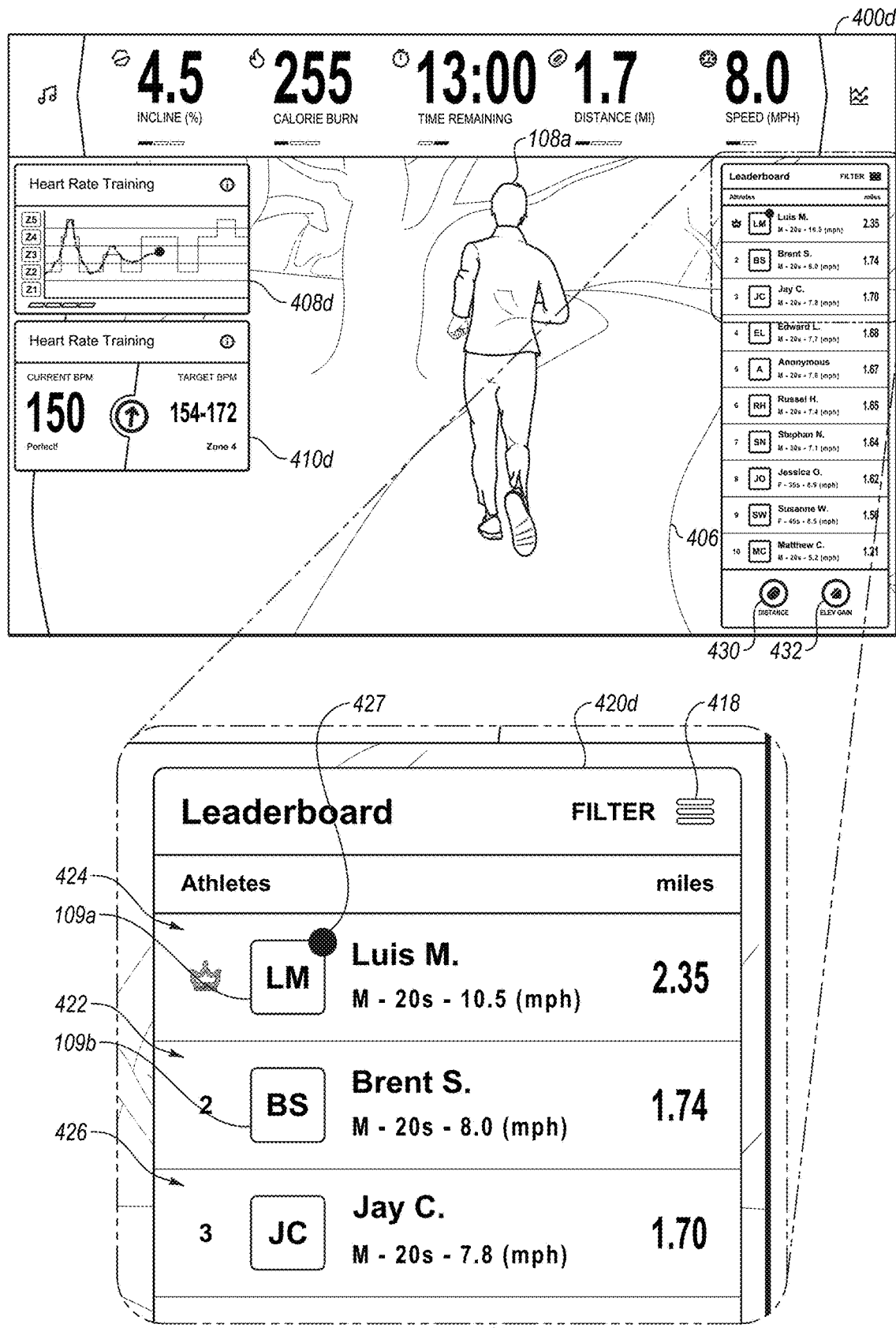

As disclosed in the frame 400d of FIG. 4D, the user 109b may be running on his treadmill 120d at a 4.5% incline at a speed of 8.0 mph. Further, as disclosed in the leaderboard 420d, with 13 minutes remaining, the user 109b (Brent S. with the performance indicators 422) remains in second place on the leaderboard 420d due to the fact that user 109a (Luis M. with the performance indicators 424) has purportedly run further during the workout than Brent S. and any other user. In other words, at the time of the leaderboard 420d, Luis M. remains in first place in the leaderboard 420d (represented by a crown), while Brent S. remains in second place, and Jay C. (with the performance indicator 426) remains in third place.

However, due to one or more irregularities having been detected in the performance of Luis M. (with the performance indicators 424) sometime previously in the workout, such as between the times of the frame 400b and the frame 400c, the leaderboard 420c continues to display an irregularity flag 427 associated with the performance indicators 424 of Luis M., to indicate one or more irregularities in the performance of Luis M. during the workout. Thus, the irregularity flag 427 serves to alert all of the users, and anyone else viewing the leaderboard 420d, that one or more irregularities were detected sometime during the workout performed by Luis M., and therefore the ranking of Luis M. in first place may not be a legitimate ranking.

It is understood that leaderboards similar to the leaderboards 420a-420d shown on the display of the user 109b in FIGS. 4A-4D may also be shown in the displays of the user 109a and all other users when performing the same video workout program, where live or archived.

Figure 5:
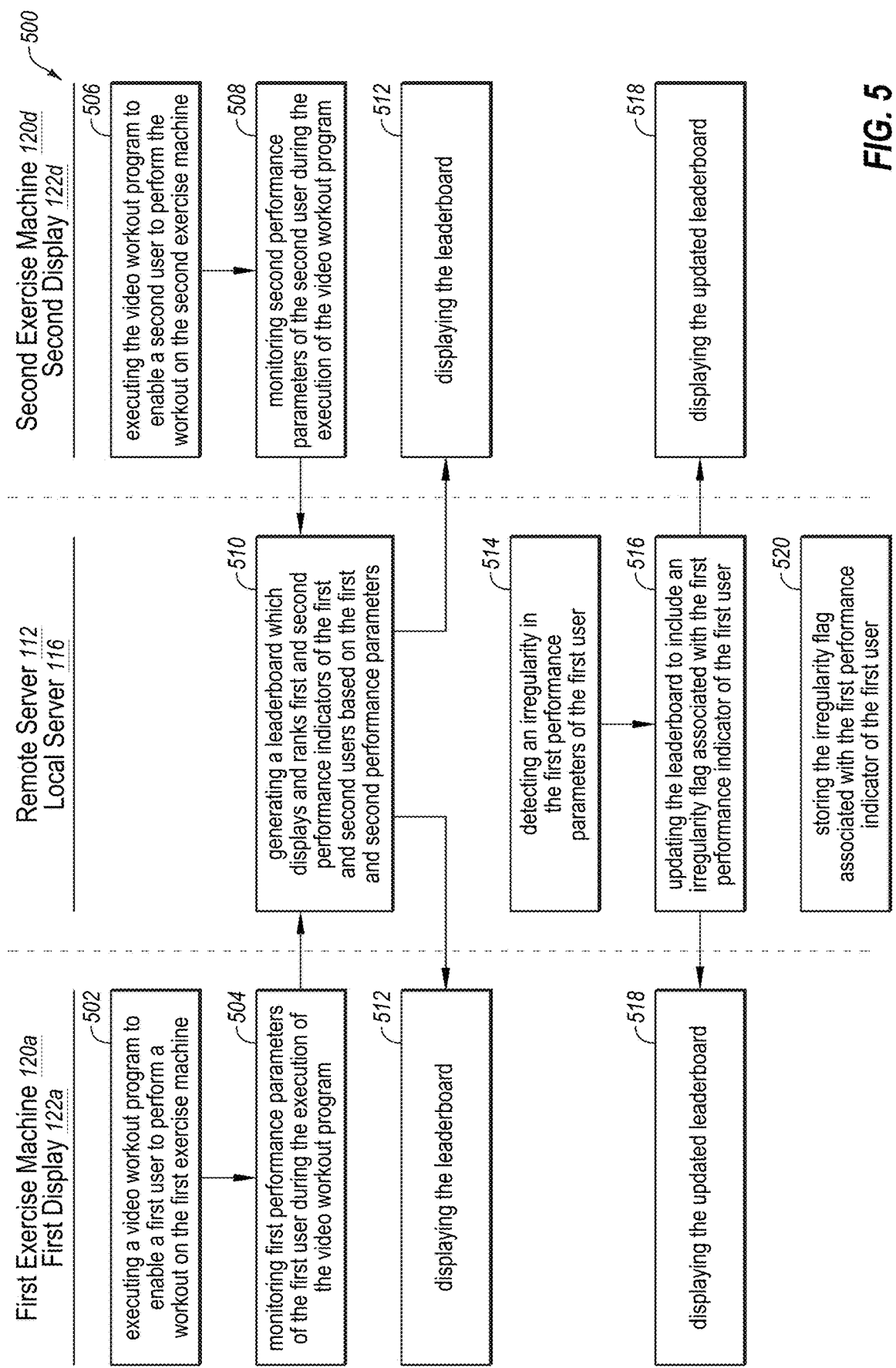
FIG. 5 illustrates a flowchart of an example method for updating a leaderboard in an exercise machine system with an irregularity flag.

FIG. 5 illustrates a flowchart of an example method 500 for updating a leaderboard in an exercise machine system with an irregularity flag. The method 500 may be performed, in some embodiments, by one or more applications, devices, or systems, such as by the video cameras 106a-106b, the computer 114, the remote server 112, the local server 116, the exercise machines 120a-120d, the consoles 122a-122d, and/or the tablet 124, or some combination thereof. In these and other embodiments, the method 500 may be performed by one or more processors based on one or more computer-readable instructions stored on one or more non-transitory computer-readable media. The method 500 will now be described in connection with FIGS. 1, 2, 3A-3D, 4A-4D, and 5.

Prior to the method 500, multiple users, such as the user 109a and 109b, may be subscribed to a subscription service (e.g., an IFIT account) that allows the users to have access to video workout programs, and the users may have logged in, or signed in, to this subscription service. This subscription service may store user profiles, as well as history information related to each user's sleep, nutrition, stress levels, exercise, wellness, and activity levels (which may be gathered automatically via sensors, or manually entered by the users). This profile and history information may be accessed to recommend particular video workout programs that will best help each user to achieve fitness goals set by the user or automatically generated for the user. By providing high quality video workout programs, a user may be incentivized to continue subscribing, and a retention rate for subscribers may be positively impacted. Further, some video workout programs employed using the method 500 may be accessed by user using a pay-per-view model rather than an ongoing subscription model. For example, a pay-per-view model may be appropriate for rare events or classes, or for one-on-one training sessions between a single trainer and a single user.

Further, prior to the method 500, video may be captured, exercise machine control commands may be encoded into the video to create a video workout program, and the video workout program may be transmitted to first and second exercise machines. For example, the video camera 106a may be employed by the videographer 110a to capture video of the trainer 108a performing a workout. In this example, the workout being performed by the trainer 108a may be running a marathon, and the video may be transmitted from the video camera 106a to the remote server 112 for further processing. Then, the computer 114 may be employed by a producer to encode exercise machine control commands into the video (such as in a subtitle stream of the video) to create a video workout program, which is then transmitted to multiple exercise machines (such as the treadmills 120a and 120d). In some embodiments, the exercise machine control commands may be configured to control a speed of one or more moveable members of the exercise machines and/or an incline percentage of one or more moveable members of the exercise machines. For example, the CSV encoding 305a, 305b, 305c, or 305d may include a control command configured to control the speed (e.g., in the $2^{nd}$ position of the CSV encoding) of the running belts 126a and 126j of the treadmills 120a and 120d, as well as a control command configured to control the incline percentage (e.g., in the $3^{rd}$ position of the CSV encoding) of the running decks 126b and 126k of the treadmills 120a and 120d. In some embodiments, changes in the exercise machine control commands may be synchronized with associated changes in a workout depicted in the video. For example, as the trainer 108a changes from running on a 0.5% incline to running on a 4.5% incline, which change is depicted in frames 300b and 300c of the video, the exercise machine control commands that are encoded with the frames 300b and 300c may be synchronized to reflect this change, namely, that the incline percentage should change from 0.5% to 4.5% (compare the $3^{rd}$ position of the CSV encoding 305b to the $3^{rd}$ position of the CSV encoding 305c).

The method 500 may include, at action 502, executing a video workout program to enable a first user to perform a workout on the first exercise machine. In some embodiments, the video workout program may include a video that depicts a trainer performing the workout and exercise machine control commands corresponding to the depiction of the trainer performing the workout in the video. In some embodiments, the executing video workout program may continuously control one or more first moveable members of the first exercise machine using the exercise machine control commands. In some embodiments, the video workout program is a live video workout program. In some embodiments, the video workout program is an archived video workout program. For example, the console 122a of the treadmill 120a may execute, at action 502, a video workout program. The video workout program may include a video that includes the frames 500a-500d (as well as intervening frames) that depict the trainer 108a performing a workout that includes running a marathon. This executing video workout program may enable the user 109a to perform the workout depicted by the trainer 108a on the treadmill 120a automatically (e.g., the speed and incline of the treadmill 120a may be adjusted automatically based on the exercise machine control commands associated with the video workout program).

The method 500 may include, at action 504, monitoring first performance parameters of the first user during the execution of the video workout program. For example, the console 122a of the treadmill 120a, the local server 116, or the remote server 112, or some combination thereof, may monitor, at action 504, first performance parameters of the user 109a during the execution of the video workout program on the treadmill 120a. The first performance parameters may include performance parameters automatically gathered by sensors in the treadmill 120a, sensors worn by the user 109a, or other sensors. The first performance parameters gathered by the sensors may be received at the treadmill 120a from the sensors. Alternatively or additionally, the first performance parameters gathered by the sensors at the treadmill 120a may be provided to and received at one or more other exercise machines 120, the local server 116, and/or the remote server 112.

The method 500 may include, at action 506, executing the video workout program to enable a second user to perform the workout on the second exercise machine. For example, the console 122d of the treadmill 120d may execute, at action 506, the same video workout program executed at action 502 by the console 122a of the treadmill 120a. This executing video workout program may enable the user 109b to perform the workout depicted by the trainer 108a on the treadmill 120d automatically. This executing at action 506 may be performed simultaneously with the executing at action 502 (e.g., in a live competition or class) or may be performed before or after the executing at action 502 (e.g., in an archived competition or class). The treadmill 120d may be located locally, to or remotely from, the treadmill 120a.

The method 500 may include, at action 508, monitoring second performance parameters of the second user during the execution of the video workout program. For example, the console 122d of the treadmill 120d, the local server 116, or the remote server 112, or some combination thereof, may monitor, at action 508, second performance parameters of the user 109b during the execution of the video workout program on the treadmill 120d.

The method 500 may include, at action 510, generating a leaderboard which displays and ranks first and second performance indicators of the first and second users based on the first and second performance parameters. For example, the consoles 122a and 122d, the local server 116, or the remote server 112, or some combination thereof, may generate, at action 510, the leaderboards 420a and 420b which display and rank performance indicators 422 and 424 of the users 109a and 109b based on the first and second performance parameters.

The method 500 may include, at action 512, displaying the leaderboard. For example, the consoles 122a and 122d of the treadmills 120a and 120d may display the leaderboard 420b along with the frame 400b of the video of the video workout program.

The method 500 may include, at action 514, detecting an irregularity in the first performance parameters of the first user. In some embodiments, the action 514 may include detecting that the video workout program was manually paused on the first exercise machine, detecting that an incline of the first exercise machine was manually decreased during the execution of the video workout program on the first exercise machine, detecting that a resistance of the first exercise machine was manually decreased during the execution of the video workout program on the first exercise machine, detecting that a speed of a running belt of a first treadmill was manually decreased during the execution of the video workout program on the first treadmill, detecting that the first user unexpectedly stepped off of a running belt during the execution of the video workout program on a first treadmill, detecting that the first user manually overrode control by the exercise machine control commands of the video workout program of the one or more first moveable members of the first exercise machine during the execution of the video workout program on the first exercise machine, detecting that a current performance of the workout by the first user is inconsistent with past performance of one or more workouts by the first user, or some combination thereof. In some embodiments, detecting that the first user unexpectedly stepped off of a running belt during the execution of the video workout program on a first treadmill may include employing a camera at the first treadmill to automatically capture one or more images of the first user unexpectedly absent from the running belt, employing a heart rate monitor to automatically detect an irregular decrease in a heart rate of the first user, or employing a current sensor on the electric motor of the first treadmill to automatically detect an irregular decrease in a current drawn to drive the electric motor, or some combination thereof. In some embodiments, detecting that a current performance of the workout by the first user is inconsistent with past performance of one or more workouts by the first user may include accessing prior performance parameters associated with prior workouts of the first user (which may be stored on one or more of the devices of FIG. 1) and comparing the prior performance parameters, an average of the prior performance parameters, or some other measure of the prior performance parameters to the first performance parameters. If the first performance parameters indicate an unexpected improvement compared to the prior performance parameters, an average thereof, etc. (e.g., if the user's pace in the workout has increased greater than 10%, 15%, or other threshold compared to the user's prior pace for similar workouts), then an irregularity may be detected in the first performance parameters. In some embodiments, the action 514 may include detecting that the first user is impersonating an expected user during the execution of the video workout program. For example, the detection of this impersonation may be accomplished by employing a current sensor on an electric motor of a first treadmill to automatically detect an irregular current drawn to drive the electric motor based on an expected weight of the expected user; employing a camera and facial recognition techniques to automatically detect that a face of the first user does not match an expected face of the expected user; employing a heart rate monitor at the first exercise machine to automatically detect that a heart rate pattern of the first user does not match an expected heart rate pattern of the expected user; employing one or more sensors at the first exercise machine to automatically detect that a biometric signature-which may include at least one of a heart rate pattern, running dynamics (e.g., cadence, ground contact time, left-right variation, and/or vertical oscillation), a fingerprint, an electrocardiogram (ECG) pattern, or a breathing pattern of the first user does not match an expected biometric signature of the expected user; or employing a weight sensor on the first exercise machine to automatically detect that a weight of the first user does not match an expected weight of the expected user; or any combination thereof. In some embodiments, the action 514 may include detecting that an expected input that is indicative of the first user exercising (e.g., running) on the first treadmill is absent, where the expected input may include, e.g., an expected movement pattern of a head of the first user, expected fluctuations in a speed of the electric motor, expected sounds of the first user striking the running deck through the running belt, or expected impacts of the first user striking the running deck through the running belt. For example, detecting that an expected input that is indicative of the first user exercising on the first treadmill is absent may include detecting that a movement pattern of a head of the first user is inconsistent with an expected movement pattern by employing a camera at the first treadmill to automatically capture one or more images of the head of the first user; employing a speed sensor operably coupled to the electric motor to detect that expected fluctuations in a speed of the electric motor are absent, employing a microphone at the first treadmill to detect that expected sounds indicative of the first user running on the first treadmill are absent, or employing an accelerometer operably coupled to the running deck to detect that expected impacts indicative of the first user running on the first treadmill are absent. For example, the console 122a, the local server 116, or the remote server 112, or some combination thereof, may detect, at action 514, an irregularity in the first performance parameters of the user 109a (Luis M.). This detecting may include detecting that Luis M. manually paused the video workout program on the treadmill 120a or unexpectedly stepped off of the running belt 126a (e.g., by standing on either side of the running belt 126a on the running deck 126b) during the execution of the video workout program (e.g., allowing Luis M. to rest and regain his strength while other users continued to run without any rest, thus giving Luis M. an unfair advantage). Also, this detecting may include detecting that Luis M. manually decreased the incline of the running deck 126b of the treadmill 120a from 4.5% to 1% (e.g., allowing Luis M. to run at an easier incline than other users, thus giving Luis M. an unfair advantage). Further, this detecting may include detecting that Luis M. manually decreased the speed of the running belt 126a of the treadmill 120a (e.g., allowing Luis M. to run at an easier speed than other users, thus giving Luis M. an unfair advantage). Further, this detecting may include detecting that the user representing himself to be Luis M. (e.g., by initially logging in or signing in to IFIT with the credentials of Luis M.) is not actually Luis M. (e.g., allowing a more fit user to impersonate Luis M. while other users are legitimately performing the workout themselves, thus giving Luis M. an unfair advantage).

In some embodiments, detecting the irregularity in the first performance parameters of the first user at action 514 may include double verifying the irregularity through a combination of any two or more of the foregoing. For example, detecting the irregularity may include both employing a speed sensor operably coupled to the electric motor to detect that expected fluctuations in a speed of the electric motor are absent and employing a microphone at the first treadmill to detect that expected sounds indicative of the first user running on the first treadmill are absent. The combination of absence of expected fluctuations in speed and absence of expected sounds indicative of running may double verify the irregularity.

The method 500 may include, at action 516, updating the leaderboard to include an irregularity flag associated with the first performance indicator of the first user. In some embodiments, this irregularity flag may indicate the irregularity in the performance of the first user during the workout. In some embodiments, the irregularity flag may include a colored shape (e.g., a red square or a yellow circle) displayed with the first performance indicator of the first user. In some embodiments, only irregularities that make the workout easier result in the leaderboard being updated to include an irregularity flag. In other embodiments, only irregularities that make the workout harder result in the leaderboard being updated to include an irregularity flag. In some embodiments, only irregularities that move a user higher on the leaderboard result in the leaderboard being updated to include an irregularity flag (e.g., if the leaderboard is ranked based on average speed, and the user manually decreases their speed, even though the workout becomes easier for the user, the user will move lower on the leaderboard due to their slower speed so no irregularity flag may be displayed). In some embodiments, any manual adjustment of the exercise machine (e.g., when the exercise machine is placed in manual mode), instead of allowing the video workout program to automatically adjust the exercise machine, may result in the leaderboard being updated to include an irregularity flag. For example, the console 122a, the local server 116, or the remote server 112, or some combination thereof, may update, at action 516, the leaderboard 420b to include an irregularity flag 427 (as disclosed in leaderboard 420c) associated with the first performance indicator of the user 109a (Luis M.) to indicate the irregularity detected at action 514.

The method 500 may include, at action 518, displaying the updated leaderboard. For example, the consoles 122a and 122d of the treadmills 120a and 120d may display, at action 518, the leaderboard 420c, including the irregularity flag 427 (illustrated as a yellow circle) displayed with the first performance indicators 424, along with the frame 400c of the video of the video workout program.

The method 500 may include, at action 520, storing the irregularity flag associated with the first performance indicator of the first user. In some embodiments, the action 520 may include storing the irregularity flag associated with the first performance indicator of the first user with an archived version of the leaderboard for the video workout program executed on the first exercise machine, and/or with an archived version of the first performance parameters for the video workout program executed on the first exercise machine. For example, the consoles 122a and 122b, the local server 116, or the remote server 112, or some combination thereof, may store, at action 520, the irregularity flag 127 associated with the first performance indicator 424 of the user 109a (Luis. M.) with an archived version of the video workout program. Storing the irregularity flag 127 may allow the irregularity flag 127 to be viewed by all future users in some embodiments (such as during future performances of the video workout program or in any history of the video workout program).

In some embodiments, the method 500 may result in the leaderboard 420b being updated in leaderboard 420c with an irregularity flag 427 for Luis M. For example, while the leaderboards 400a-400c are continuously ranking users based on some performance parameter (e.g., miles run), any irregularities in the performance parameters of the users may be detected, and the leaderboard may be updated with an irregularity flag 427 (e.g., a yellow circle) for users such as Luis M. to indicate the irregularity in the performance of Luis M. during the workout. Displaying Luis M. on the leaderboard 420c with an irregularity flag may lessen or eliminate the frustration and sense of unfairness felt by other users, such as Brent S., who follow the workout prescribed in a video workout program. As such, effectively employing the irregularity flag 427 on the leaderboard 420c may allow Brent S. to have greater trust in the leaderboard rankings, and may allow Brent S. to connect to other users and may make the workout on the treadmill 120d more fun.

Although the actions of the method 500 are illustrated in FIG. 5 as discrete actions, various actions may be divided into additional actions, combined into fewer actions, reordered, expanded, or eliminated, depending on the desired implementation. For example, in some embodiments, actions 502, 504, 506, 508, and 518 may be performed without performing the other actions of the method 500. Further, in some embodiments, actions 510, 514, and 516 may be performed without performing the other actions of the method 500.

Another variation of the method 500 may include receiving the first performance parameters of the first user, the first user being associated with the first exercise machine that executes a video workout program to enable the first user to perform a workout on the first exercise machine. For example, as previously indicated, the treadmill 120a, another exercise machine 120, the local server 116, and/or the remote server 112 may receive the first performance parameters after being gathered by sensors at the first treadmill 120a as part of the action 504. This variation of the method 500 may also include the action 514 of detecting an irregularity in the first performance parameters that indicates a performance of the workout by the first user is different than expected.

In some embodiments, the detecting of the irregularity in the first performance parameters of the first user may include detecting that the first user manually overrode control by exercise machine control commands of the video workout program of one or more first moveable members of the first exercise machine during the execution of the video workout program on the first exercise machine.

In some embodiments, the detecting of the irregularity in the first performance parameters of the first user may include at least one of: detecting that a difficulty of the workout is less than an expected difficulty of the workout due to a manual adjustment of an operating parameter of the first exercise machine, detecting that the first user has at least temporarily ceased performance of the workout while the video workout program continues to execute on the first exercise machine, or detecting that the first user is impersonating an expected user during the execution of the video workout program on the first exercise machine. Detecting that the difficulty of the workout is less than an expected difficulty of the workout due to a manual adjustment of an operating parameter of the first exercise machine may include at least one of: detecting that the video workout program was manually paused on the first exercise machine, detecting that an incline of the first exercise machine was manually decreased during the execution of the video workout program on the first exercise machine, detecting that a resistance of the first exercise machine was manually decreased during the execution of the video workout program on the first exercise machine, or detecting that a speed of a running belt of a first treadmill was manually decreased during the execution of the video workout program on the first treadmill. Detecting that the first user has at least temporarily ceased performance of the workout while the video workout program continues to execute on the first exercise machine may include detecting that the first user unexpectedly stepped off of a running belt during the execution of the video workout program on a first treadmill (e.g., by employing a camera, a heart rate monitor, or a current sensor). Detecting that the first user is impersonating an expected user during the execution of the video workout program on the first exercise machine may include employing a current sensor on an electric motor of a first treadmill to automatically detect an irregular current drawn to drive the electric motor based on an expected weight of the expected user, employing a camera and facial recognition techniques to automatically detect that a face of the first user does not match an expected face of the expected user, employing a heart rate monitor at the first exercise machine to automatically detect that a heart rate pattern of the first user does not match an expected heart rate pattern of the expected user, employing one or more sensors at the first exercise machine to automatically detect that a biometric signature-which may include at least one of a heart rate pattern, running dynamics (e.g., cadence, ground contact time, left-right variation, and/or vertical oscillation), a fingerprint, an electrocardiogram (ECG) pattern, or a breathing pattern of the first user does not match an expected biometric signature of the expected user, employing a weight sensor on the first exercise machine to automatically detect that a weight of the first user does not match an expected weight of the expected user, or any combination thereof.

In some embodiments, the first exercise machine is one of multiple exercise machines and the method may further include, in response to the detecting the irregularity, updating a leaderboard displayed on displays at the exercise machines to display an irregularity flag associated with a first performance indicator of the first user to indicate the irregularity in a performance of the first user during the workout.

Figure 6:
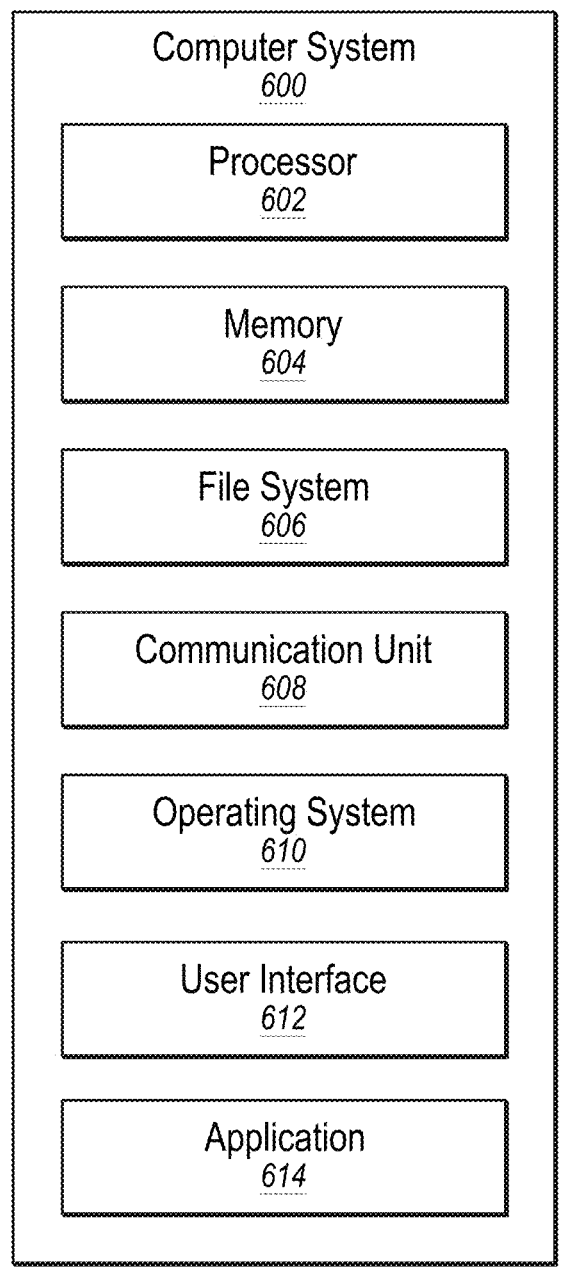
FIG. 6 illustrates an example computer system that may be employed in updating a leaderboard in an exercise machine system with an irregularity flag.

FIG. 6 illustrates an example computer system 600 that may be employed in updating a leaderboard in an exercise machine system with an irregularity flag. In some embodiments, the computer system 600 may be part of any of the systems or devices described in this disclosure. For example, the computer system 600 may be part of any of the video cameras 106a-106b, the computer 114, the remote server 112, the local server 116, the exercise machines 120a-120d, the consoles 122a-122d, or the tablet 124 of FIG. 1.

The computer system 600 may include a processor 602, a memory 604, a file system 606, a communication unit 608, an operating system 610, a user interface 612, and an application 614, which all may be communicatively coupled. In some embodiments, the computer system may be, for example, a desktop computer, a client computer, a server computer, a mobile phone, a laptop computer, a smartphone, a smartwatch, a tablet computer, a portable music player, an exercise machine console, a video camera, or any other computer system.

Generally, the processor 602 may include any suitable special-purpose or general-purpose computer, computing entity, or processing device including various computer hardware or software applications and may be configured to execute instructions stored on any applicable computer-readable storage media. For example, the processor 602 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 602 may interpret and/or execute program instructions and/or process data stored in the memory 604 and/or the file system 606. In some embodiments, the processor 602 may fetch program instructions from the file system 606 and load the program instructions into the memory 604. After the program instructions are loaded into the memory 604, the processor 602 may execute the program instructions. In some embodiments, the instructions may include the processor 602 performing one or more actions of the method 500 of FIG. 5.

The memory 604 and the file system 606 may include computer-readable storage media for carrying or having stored thereon computer-executable instructions or data structures. Such computer-readable storage media may be any available non-transitory media that may be accessed by a general-purpose or special-purpose computer, such as the processor 602. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 602 to perform a certain operation or group of operations, such as one or more actions of the method 500 of FIG. 5. These computer-executable instructions may be included, for example, in the operating system 610, in one or more applications, or in some combination thereof.

The communication unit 608 may include any component, device, system, or combination thereof configured to transmit or receive information over a network, such as the network 118 of FIG. 1. In some embodiments, the communication unit 608 may communicate with other devices at other locations, the same location, or even other components within the same system. For example, the communication unit 608 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMAX device, a cellular communication device, etc.), and/or the like. The communication unit 608 may permit data to be exchanged with a network and/or any other devices or systems, such as those described in the present disclosure.

The operating system 610 may be configured to manage hardware and software resources of the computer system 600 and configured to provide common services for the computer system 600.

The user interface 612 may include any device configured to allow a user to interface with the computer system 600. For example, the user interface 612 may include a display, such as an LCD, LED, or other display, that is configured to present video, text, application user interfaces, and other data as directed by the processor 602. The user interface 612 may further include a mouse, a track pad, a keyboard, a touchscreen, volume controls, other buttons, a speaker, a microphone, a camera, any peripheral device, or other input or output device. The user interface 612 may receive input from a user and provide the input to the processor 602. Similarly, the user interface 612 may present output to a user.

The application 614 may be one or more computer-readable instructions stored on one or more non-transitory computer-readable media, such as the memory 604 or the file system 606, that, when executed by the processor 602, is configured to perform one or more actions of the method 500 of FIG. 5. In some embodiments, the application 614 may be part of the operating system 610 or may be part of an application of the computer system 600, or may be some combination thereof.

INDUSTRIAL APPLICABILITY

Various modifications to the embodiments illustrated in the drawings will now be disclosed.

In general, some example methods disclosed herein may enable a user ranked on a leaderboard to be displayed with an irregularity flag where some irregularity is detected in the user's performance. For example, when an irregularity in the performance parameters of the user is detected (e.g., detecting that the user manually decreased the incline percentage on their treadmill, resulting in the user no longer fairly competing against other users who maintained their incline percentage at the prescribed percentage), the listing of the user on the leaderboard may be updated to display an irregularity flag (e.g., a red square or a yellow circle) to indicate the irregularity in the performance of the first user during the workout. Displaying any user with detected irregularities in their performance parameters on the leaderboard with an irregularity flag may lessen or eliminate the frustration and sense of unfairness felt by users who follow the workout prescribed in a video workout program.

In some embodiments, each time an irregularity flag is generated for a user, the details that led to the generation of the irregularity flag may be stored and analyzed. This storing and analyzing may result in the generation of a reputation score with regard to irregularities. Thus, each user may have a reputation score generated and continually updated that indicates the extent to which the user typically complies with the prescribed parameters of video workout programs. This reputation score may be affected differently for different types of irregularities (e.g., a user pausing a workout may negatively affect the score much less than a user employing user impersonation or allowing a running belt to run after having stepped away from the machine). This reputation score may then be used as a filter criteria to allow users to exclude users with reputation scores below a certain score threshold from appearing in a leaderboard. This reputation score may be expressed as a percentage, or as a number of stars (e.g., from one star being a bad reputation to five stars being a good reputation). This reputation score may also be displaying in a leaderboard to allow users to be visually compared, or even ranked, based on their reputations. Further, this storing may allow each irregularity flag to be linking to the details that led to the irregularity flag, which may allow users to simply select an irregularity flag in the display of a leaderboard and to then be presented with these details, in a pop-up window for example. Additionally or alternatively, the details that led to the irregularity flag may appear in any general listing of user statistics that are generally linked to the performance indicator of a user listed in a leaderboard. In these embodiments, a process may be established for a user to challenge or appeal the generation of any particular irregularity flag in an effort to remove an irregularity flag from a particular leaderboard. For example, where an irregularity was detected during a workout due to some sort of equipment or communication failure, but the user legitimately performed the workout within the prescribed parameters, the user may appeal to an arbitrator of the subscription service to have the irregularity flag for workout removed, and also to have any negative effect of the irregularity flag removed from the user's reputation score.

In some embodiments, an irregularity flag may include any visually discernable alteration of or addition to a user's entry in a leaderboard where the user's entry includes the user's performance indicators. As examples, an irregularity flag may include a circle, square, triangle, arrow, asterisk, or other shape that is red, yellow, black or other color and is displayed in or near the user's entry in the leaderboard; highlighting applied to some or all of the user's entry in the leaderboard; greying out of some or all of the user's entry in the leaderboard; bolding or other change (e.g., italics, underline, font size) applied to some or all of the text in the user's entry in the leaderboard; a word (e.g., "irregular") or phrase positioned in or near the user's entry in the leaderboard; or other visually discernable alteration of or addition to some or all of the user's entry in the leaderboard, or any combination of the foregoing.

In some embodiments, a variety of different irregularity flags may be employed to represent different types of irregularities. For example, different colors, shapes, or sizes, or some combination thereof, may be employed to represent different types of irregularities. Irregularities may be categorized by severity (e.g., ranging from unintentional behavior to intentional behavior), length of time (e.g., ranging from short to long breaks during the workout), impact (e.g., ranging from minimum to maximum impact of the irregularity on movement within the rankings in the leaderboard), etc.

In some embodiments, the leaderboard may be displayed to the side of the video in a video workout program, rather than overlaying the video. Further, in some embodiments, the leaderboard may be displayed in a partially-transparent manner to allow the underlying video to be at least partially viewed by the user even with the leaderboard overlaying a portion of the video. Further, the leaderboard may be repositionable by the user and/or may be hidden and unhidden by the user (e.g., by swiping the leaderboard right and left on a touchscreen to hide and unhide the leaderboard).

In some embodiments, multiple users may simultaneously appear with irregularity flags in a leaderboard. Also, where an irregularity is detected that involves multiple users, the irregularity flags of the affected users may be visually linked together (e.g., where multiple users all took a break at the same time and for the same duration during a workout).

In some embodiments, data collected from sensors or a camera to detect irregularities of a user's performance parameters may alternatively or additionally be used to detect the user's cadence, running dynamics, or other information. For example, images or video (e.g., a series of images) generated by a camera at the user's exercise machine may capture a repeating movement pattern of the user's head, such as where the user's head bobs up and down while the user runs on the exercise machine (if it is a treadmill), the user's head moves from side-to-side while the user pedals on the exercise machine (if it is a stationary bike), or the user's head repeats some other motion while the user exercises on some other exercise machine. Image analysis may be performed on the images to determine times when the user's head is at or near one or more movement peaks (e.g., at or near the top and/or bottom of a bob, at or near the leftmost and/or rightmost positions of a side-to-side motion, etc.) from which the user's cadence, magnitude of vertical oscillations (in the case of a treadmill), magnitude of side-to-side sway (in the case of a stationary bike), or other running or exercise dynamics may be determined.

As another example, a speed sensor (e.g., a tachometer) and/or a current sensor operably coupled to an electric motor of a treadmill may be used to detect cadence, ground contact time, and/or left-right variation of a user. In this example, as the user runs on the treadmill, the user's weight may be selectively weighted and unweighted on the running deck with each stride. The user's weight is applied to the running deck after the user's foot makes contact with the running deck and the user's weight slows the speed of the running belt and thus the electric motor, which in turn causes a load spike on the current of the electric motor as the electric motor attempts to maintain its speed. The user's weight is lifted from the running deck after the user's foot is lifted from the running deck and the speed of the running belt returns to its unloaded speed with less current required for the electric motor to maintain its speed. Accordingly, the cadence may be determined from the speed fluctuations and/or the current fluctuations. Ground contact time may be determined from durations of the load spike and/or the speed decrease during each stride. Left-right variation may be determined by comparing odd (or even) ground contact times (or an average thereof) with even (or odd) ground contact times (or an average thereof).

As another example, a microphone at the treadmill and/or an accelerometer operably coupled to the running deck of the treadmill or other portion of the treadmill may be used to detect cadence. In this example, as the user runs on the treadmill, each stride of the user involves a footfall on the running deck of the treadmill. The sound of each footfall on the running deck may be captured by the microphone and/or the impact of each footfall may be detected by the accelerometer. Thus, audio captured by the microphone may be analyzed to determine a time of each footfall and the user's cadence. Alternatively or additionally, a signal generated by the accelerometer may be analyzed to determine the time of each footfall and the user's cadence.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

A. A method for updating a leaderboard in an exercise machine system, the method comprising:
  executing, on a first exercise machine, a video workout program to enable a first user to perform a workout on the first exercise machine;
  monitoring, at the first exercise machine, first performance parameters of the first user during the execution of the video workout program on the first exercise machine; executing, on a second exercise machine, the video workout program to enable a second user to perform the workout on the second exercise machine;
  monitoring, at the second exercise machine, second performance parameters of the second user during the execution of the video workout program on the second exercise machine;
  displaying, on a first display at the first exercise machine and on a second display at the second exercise machine, a leaderboard which displays and ranks a first performance indicator of the first user and a second performance indicator of the second user based on the first performance parameters and the second performance parameters;
  detecting an irregularity in the first performance parameters of the first user; and updating, on the first display at the first exercise machine and on the second display at the second exercise machine, the leaderboard to display an irregularity flag associated with the first performance indicator of the first user to indicate the irregularity in a performance of the first user during the workout.

B. The method of claim A, wherein the irregularity flag comprises a colored shape displayed with the first performance indicator of the first user.

C. The method of claim B, wherein the colored shape comprises a yellow circle.

D. The method of one of claims A-C, wherein the detecting of the irregularity in the first performance parameters of the first user comprises detecting that the video workout program was manually paused on the first exercise machine.

E. The method of one of claims A-C, wherein the detecting of the irregularity in the first performance parameters of the first user comprises detecting that an incline of the first exercise machine was manually decreased during the execution of the video workout program on the first exercise machine.

F. The method of one of claims A-C, wherein the detecting of the irregularity in the first performance parameters of the first user comprises detecting that a resistance of the first exercise machine was manually decreased during the execution of the video workout program on the first exercise machine.

G. The method of one of claims A-C, wherein the first exercise machine comprises a first treadmill comprising:
  a running deck;
  a running belt; and
  an electric motor configured to move the running belt during the execution of the video workout program.

H. The method of claim G, wherein the detecting of the irregularity in the first performance parameters of the first user comprises detecting that the first user unexpectedly stepped off of the running belt during the execution of the video workout program on the first treadmill.

I. The method of claim H, wherein the detecting that the first user unexpectedly stepped off of the running belt during the performance of the workout on the first treadmill comprises at least one of:
  employing a camera at the first treadmill to automatically capture one or more images of the first user unexpectedly absent from the running belt;
  employing a heart rate monitor to automatically detect an irregular decrease in a heart rate of the first user; or
  employing a current sensor on the electric motor of the first treadmill to automatically detect an irregular decrease in a current drawn to drive the electric motor.

J. The method of claim H, wherein the detecting that the first user unexpectedly stepped off of the running belt during the performance of the workout on the first treadmill comprises employing a camera at the first treadmill to automatically capture one or more images of the first user unexpectedly absent from the running belt.

K. The method of claim H, wherein the detecting that the first user unexpectedly stepped off of the running belt during the performance of the workout on the first treadmill comprises employing a heart rate monitor to automatically detect an irregular decrease in a heart rate of the first user.

L. The method of claim H, wherein the detecting that the first user unexpectedly stepped off of the running belt during the performance of the workout on the first treadmill comprises employing a current sensor on the electric motor of the first treadmill to automatically detect an irregular decrease in a current drawn to drive the electric motor.

M. The method of claim G, wherein:
the detecting of the irregularity in the first performance parameters of the first user comprises detecting that the first user is impersonating an expected user during the execution of the video workout program on the first treadmill; and
the detecting that the first user is impersonating the expected user during the execution of the video workout program on the first treadmill comprises employing a current sensor on the electric motor of the first treadmill to automatically detect an irregular current drawn to drive the electric motor based on an expected weight of the expected user.

N. The method of claim G, wherein the detecting of the irregularity in the first performance parameters of the first user comprises detecting that a speed of the running belt of the first treadmill was manually decreased during the execution of the video workout program on the first treadmill.

O. The method of claim G, wherein the detecting of the irregularity in the first performance parameters of the first user comprises detecting that an expected input that is indicative of the first user running on the first treadmill is absent.

P. The method of claim O, wherein the expected input comprises at least one of:
an expected movement pattern of a head of the first user;
expected fluctuations in a speed of the electric motor;
expected sounds of the first user striking the running deck through the running belt; or expected impacts of the first user striking the running deck through the running belt.

Q. The method of claim G, wherein the detecting of the irregularity in the first performance parameters of the first user comprises detecting that a movement pattern of a head of the first user is inconsistent with an expected movement pattern by employing a camera at the first treadmill to automatically capture one or more images of the head of the first user.

R. The method of claim G, wherein the detecting of the irregularity in the first performance parameters of the first user comprises employing a speed sensor operably coupled to the electric motor to detect that expected fluctuations in a speed of the electric motor are absent.

S. The method of claim G, wherein the detecting of the irregularity in the first performance parameters of the first user comprises employing a microphone at the first treadmill to detect that expected sounds indicative of the first user running on the first treadmill are absent.

T. The method of claim G, wherein the detecting of the irregularity in the first performance parameters of the first user comprises employing an accelerometer operably coupled to the running deck to detect that expected impacts indicative of the first user running on the first treadmill are absent.

U. The method of one of claims A-C, wherein the detecting of the irregularity in the first performance parameters of the first user comprises detecting that the first user is impersonating an expected user during the execution of the video workout program on the first exercise machine.

V. The method of claim U, wherein the detecting that the first user is impersonating the expected user during the execution of the video workout program on the first exercise machine comprises employing a camera and facial recognition techniques to automatically detect that a face of the first user does not match an expected face of the expected user.

W. The method of claim U, wherein the detecting that the first user is impersonating the expected user during the execution of the video workout program on the first exercise machine comprises employing a heart rate monitor at the first exercise machine to automatically detect that a heart rate pattern of the first user does not match an expected heart rate pattern of the expected user.

X. The method of claim U, wherein the detecting that the first user is impersonating the expected user during the execution of the video workout program on the first exercise machine comprises employing one or more sensors at the first exercise machine to automatically detect that a biometric signature of the first user does not match an expected biometric signature of the expected user.

Y. The method of X, wherein the biometric signature includes at least one of a heart rate pattern, running dynamics, a fingerprint, an electrocardiogram (ECG) pattern, or a breathing pattern.

Z. The method of claim U, wherein the detecting that the first user is impersonating the expected user during the execution of the video workout program on the first exercise machine comprises employing a weight sensor on the first exercise machine to automatically detect that a weight of the first user does not match an expected weight of the expected user.

AA. The method of one of claims A-C, wherein the detecting of the irregularity in the first performance parameters of the first user comprises detecting that a current performance of the workout by the first user is inconsistent with past performance of one or more workouts by the first user.

BB. A method for updating a leaderboard in an exercise machine system, the method comprising:
executing, on a first exercise machine, a video workout program to enable a first user to perform a workout on the first exercise machine, the video workout program comprising a video that depicts a trainer performing the workout, the video workout program further comprising exercise machine control commands corresponding to the depiction of the trainer performing the workout in the video, the executing video workout program continuously controlling one or more first moveable members of the first exercise machine using the exercise machine control commands;
monitoring, at the first exercise machine, first performance parameters of the first user during the execution of the video workout program on the first exercise machine;
executing, on a second exercise machine, the video workout program to enable a second user to perform the workout on the second exercise machine, the executing video workout program continuously controlling one or more second moveable members of the second exercise machine using the exercise machine control commands;
monitoring, at the second exercise machine, second performance parameters of the second user during the execution of the video workout program on the second exercise machine;
displaying, on a first display at the first exercise machine and on a second display at the second exercise machine, a leaderboard which displays and ranks a first performance indicator of the first user and a second performance indicator of the second user based on the first performance parameters and the second performance parameters;
detecting an irregularity in the first performance parameters of the first user; and
updating, on the first display at the first exercise machine and on the second display at the second exercise machine, the leaderboard to display an irregularity flag associated with the first performance indicator of the first user to indicate the irregularity in a performance of the first user during the workout.

CC. The method of claim BB, wherein the detecting of the irregularity in the first performance parameters of the first user includes detecting that the first user manually overrode control by the exercise machine control commands of the video workout program of the one or more first moveable members of the first exercise machine during the execution of the video workout program on the first exercise machine.

DD. The method of one of claims BB-CC, wherein the video workout program is a live video workout program.

EE. The method of one of claims BB-DD, further comprising:
storing the irregularity flag associated with the first performance indicator of the first user:
with an archived version of the leaderboard for the video workout program executed on the first exercise machine; and/or
with an archived version of the first performance parameters for the video workout program executed on the first exercise machine.

FF. A method for identifying an irregularity in performance parameters of a user, the method comprising:
receiving first performance parameters of a first user associated with a first exercise machine that executes a video workout program to enable the first user to perform a workout on the first exercise machine; and
detecting an irregularity in the first performance parameters that indicates a performance of the workout by the first user is different than expected.

GG. The method of claim FF, wherein the detecting of the irregularity in the first performance parameters of the first user includes detecting that the first user manually overrode control by exercise machine control commands of the video workout program of one or more first moveable members of the first exercise machine during the execution of the video workout program on the first exercise machine.

HH. The method of one of claims FF-GG, wherein the detecting of the irregularity in the first performance parameters of the first user includes at least one of:
detecting that a difficulty of the workout is less than an expected difficulty of the workout due to a manual adjustment of an operating parameter of the first exercise machine;
detecting that the first user has at least temporarily ceased performance of the workout while the video workout program continues to execute on the first exercise machine; or
detecting that the first user is impersonating an expected user during the execution of the video workout program on the first exercise machine.

II. The method of one of claims FF-HH, wherein the first exercise machine is one of a plurality of exercise machines, the method further comprising, in response to the detecting the irregularity, updating a leaderboard displayed on a plurality of displays at the plurality of exercise machines to display an irregularity flag associated with a first performance indicator of the first user to indicate the irregularity in a performance of the first user during the workout.

The invention claimed is:

1. A method for flagging irregularities in user performance in an exercise machine system, the method comprising:
receiving, by a processing unit operatively connected to a first exercise machine, first performance parameters of a first user of the first exercise machine that is executing a video workout program to enable the first user to perform a workout on the first exercise machine;
detecting, by the processing unit, an irregularity in the first performance parameters that indicates a performance of the workout by the first user is different than expected, wherein the irregularity is detected based on a comparison between the first performance parameters and expected performance parameters; and
displaying, in response to the detecting of the irregularity and on a leaderboard displayed by a display of a second exercise device, a visually discernable indication associated with a first performance indicator of the first user to visually indicate the irregularity, the first performance indicator of the first user being based on the first performance parameters.

2. The method of claim 1, wherein: the first exercise machine comprises a first treadmill comprising: a running deck, a running belt, and an electric motor configured to move the running belt during the execution of the video workout program; and the detecting of the irregularity in the first performance parameters of the first user comprises detecting that an expected input that is indicative of the first user running on the first treadmill is absent.

3. The method of claim 2, wherein the expected input includes an expected movement pattern of a head of the first user.

4. The method of claim 2, wherein the expected input includes expected fluctuations in a speed of the electric motor.

5. The method of claim 2, wherein the expected input includes expected sounds of the first user striking the running deck through the running belt.

6. The method of claim 2, wherein the expected input includes expected impacts of the first user striking the running deck through the running belt.

7. The method of claim 1, wherein the detecting of the irregularity in the first performance parameters of the first user includes detecting that the first user manually overrode control by exercise machine control commands of the video workout program of one or more first moveable members of the first exercise machine during the execution of the video workout program on the first exercise machine.

8. The method of claim 1, wherein the detecting of the irregularity in the first performance parameters of the first user includes detecting that a difficulty of the workout is less than an expected difficulty of the workout due to a manual adjustment of an operating parameter of the first exercise machine.

9. The method of claim 1, wherein the detecting of the irregularity in the first performance parameters of the first user includes detecting that the first user has at least temporarily ceased performance of the workout while the video workout program continues to execute on the first exercise machine.

10. The method of claim 1, wherein the detecting of the irregularity in the first performance parameters of the first user includes detecting that the first user is impersonating an expected user during the execution of the video workout program on the first exercise machine.

11. A method for flagging irregularities in user performance in an exercise machine system, the method comprising:
   executing, on a first exercise machine, a video workout program to enable a first user to perform a workout on the first exercise machine;
   monitoring, at the first exercise machine, first performance parameters of the first user during the execution of the video workout program on the first exercise machine;
   executing, on a second exercise machine, the video workout program to enable a second user to perform the workout on the second exercise machine;
   monitoring, at the second exercise machine, second performance parameters of the second user during the execution of the video workout program on the second exercise machine;
   displaying, on a first display at the first exercise machine and on a second display at the second exercise machine, a leaderboard which displays and ranks a first performance indicator of the first user and a second performance indicator of the second user based on the first performance parameters and the second performance parameters;
   detecting an irregularity in the first performance parameters that indicates that the performance of the workout by the first user is different than expected, wherein the irregularity is detected based on a comparison between the first performance parameters and expected performance parameters; and
   in response to the detecting of the irregularity, updating, on the first display at the first exercise machine and on the second display at the second exercise machine, the leaderboard to display a visually discernable indication associated with the first performance indicator of the first user to visually indicate the irregularity in the performance of the workout by the first user.

12. The method of claim 11, wherein: the first exercise machine comprises a first treadmill comprising: a running deck, a running belt, and an electric motor configured to move the running belt during the execution of the video workout program; and the detecting of the irregularity in the first performance parameters of the first user comprises detecting that an expected input that is indicative of the first user running on the first treadmill is absent.

13. The method of claim 12, wherein the expected input includes an expected movement pattern of a head of the first user.

14. The method of claim 12, wherein the expected input includes expected fluctuations in a speed of the electric motor.

15. The method of claim 12, wherein the expected input includes expected sounds of the first user striking the running deck through the running belt.

16. The method of claim 12, wherein the expected input includes expected impacts of the first user striking the running deck through the running belt.

17. The method of claim 11, wherein the detecting of the irregularity in the first performance parameters of the first user includes detecting that the first user manually overrode control by exercise machine control commands of the video workout program of one or more first moveable members of the first exercise machine during the execution of the video workout program on the first exercise machine.

18. The method of claim 11, wherein the detecting of the irregularity in the first performance parameters of the first user includes detecting that a difficulty of the workout is less than an expected difficulty of the workout due to a manual adjustment of an operating parameter of the first exercise machine.

19. The method of claim 11, wherein the detecting of the irregularity in the first performance parameters of the first user includes detecting that the first user has at least temporarily ceased performance of the workout while the video workout program continues to execute on the first exercise machine.

20. The method of claim 11, wherein the detecting of the irregularity in the first performance parameters of the first user includes detecting that the first user is impersonating an expected user during the execution of the video workout program on the first exercise machine.

* * * * *